United States Patent
Gupta et al.

(10) Patent No.: US 7,787,887 B2
(45) Date of Patent: Aug. 31, 2010

(54) PROVIDING LOCATION-BASED SERVICES VIA WIRELESS NETWORKS

(75) Inventors: Puneet Gupta, Bangalore (IN); Kartik Muralidharan, Bangalore (IN); Rajat Laxmichand Gogri, Mumbai (IN); Kavitha Damodhiran, Peelamedu-Coimbatore (IN)

(73) Assignee: Infosys Technolologies Ltd., Bangalore (IN)

( * ) Notice: Subject to any disclaimer, the term of this patent is extended or adjusted under 35 U.S.C. 154(b) by 567 days.

(21) Appl. No.: 11/532,873

(22) Filed: Sep. 18, 2006

(65) Prior Publication Data

US 2007/0149212 A1 Jun. 28, 2007

(30) Foreign Application Priority Data

Dec. 26, 2005 (IN) .................. 1924/CHE/2005

(51) Int. Cl.
*H04W 24/00* (2009.01)
(52) U.S. Cl. ................. 455/456.1; 455/456.3
(58) Field of Classification Search ............... 455/456.1
See application file for complete search history.

(56) References Cited

U.S. PATENT DOCUMENTS

| 6,604,140 B1* | 8/2003 | Beck et al. ................. 709/226 |
| 2001/0018349 A1* | 8/2001 | Kinnunen et al. ............ 455/456 |
| 2005/0193106 A1* | 9/2005 | Desai et al. ................. 709/223 |
| 2006/0212346 A1* | 9/2006 | Brazell et al. ................ 705/14 |
| 2006/0218040 A1* | 9/2006 | Sabapathypillai ............ 705/15 |
| 2006/0253559 A1* | 11/2006 | Espina Perez et al. ....... 709/222 |

OTHER PUBLICATIONS

O. Spaniol, A. Fasbender, S. Hoff, J. Kaltwasser, and J. Kassubek, "Impacts of mobility on telecommunication and data communication networks," *IEEE Personal Communications*, pp. 20-33, Oct. 1995.
Carl Zetie, "Location-Based Services In The Enterprise," *Forrester Research*, Best Practices, 19 pages, Jun. 2004.
Munson and Gupta, "Location-based notification as a general-purpose service," *WMC'02*, pp. 40-44, Sep. 28, 2002.
J. Hightower, G. Borriello, "Location systems for ubiquitous computing," *IEEE Computer*, vol. 34, Issue 8, pp. 57-66, Aug. 2001.
Bharat Rao, Louis Minakakis, "Evolution of Mobile Location-Based Services," *Communications of the ACM*, vol. 46, No. 12, pp. 61-65, Dec. 2003.

(Continued)

*Primary Examiner*—Nick Corsaro
*Assistant Examiner*—Edd Rianne Plata
(74) *Attorney, Agent, or Firm*—Klarquist Sparkman, LLP

(57) ABSTRACT

Location-based services can be provided by broadcasting location-based information within wireless network zones. A system for providing location-based services within an ad-hoc wireless network zone can include an information server for providing the location-based services by broadcasting location-based information, where the broadcast location-based information is received by a client wireless device when the client wireless device enters the ad-hoc wireless network zone. Location-based services can be provided within an ad-hoc wireless network zone by broadcasting location-based information regarding the location-based services. The broadcast can be received by a client wireless device within the zone. The client wireless device can display alerts based on the received location-based information.

16 Claims, 17 Drawing Sheets

OTHER PUBLICATIONS

Puneet Gupta, Deependra Moitra, "Evolving a pervasive IT Infrastructure: a technology integration approach," *ACM, Personal and Ubiquitous Computing*, vol. 8(1), pp. 31-41, Feb. 2004.

G.M. Giaglis, P. Kourouthanassis, A. Tsamakos, "Towards a classification Framework for Mobile Location Services," *Mobile Commerce: Technology, Theory, and Applications*, Chapter 4, Idea Group Publishing, pp. 64-81, 2003.

P. Bahl, V. Padmanaban, "RADAR: An In-Building RFBased User Location and Tracking System," *Proceedings of IEEE Infocom 2000*, Tel Aviv, Israel, pp. 775-784, Mar. 2000.

Jason Ye, "Atlantis: Location Based Services with Bluetooth," Brown University, pp. 1-8, May 2005.

Scooter Willis, Sumi Helal, "A Passive RFID Information Grid for Location and Proximity Sensing for Blind User," *University of Florida Technical Report No. TR04-009*, 20 pages, 2004.

Lionel M, Yunhao Liu, Yiu Cho Lau, A. Patil, "LANDMARC: Indoor Location Sensing using Active RFID," *IEEE PerCom 2003*, 9 pages, Mar. 2003.

Yen-Cheng Chen, Yao-Jung Chan, Cheung-Wo She, "Enabling location-Based Services in Wireless LAN hotspots," *Int. J. Network Mgmt*, John Wiley & Sons, Inc., vol. 15, pp. 163-175, Feb. 2005.

Ping Tao, Algis Rudys, Andrew M. Ladd, Dan S. Wallach, "Wireless Location-Sensing for Security Applications," *WiSE '03*, pp. 11-20, Sep. 19, 2003.

Koo et al., "Location discovery in enterprise-based wireless networks: implementations and applications," *Proceeding of the $2^{nd}$ IEEE Workshop on Applications and Services in Wireless Networks*, pp. 1-12, Jul. 2002.

Ivana Podnar, Manfred Hauswirth, Mehdi Jazayeri, "Mobile Push: Delivering Content to Mobile Users," *In Proceedings of the 22nd International Conference on Distributed Computing System Workshops (ICDCSW)*, 6 pages, Jul. 2002.

Jianting Zhang, Le Gruenwald, "Prioritized Sequencing for Efficient Query on Broadcast Geographical Information in Mobile-computing," *GIS'02*, pp. 88-93, Nov. 8-9, 2002.

A. Kaminsky, "Infrastructure for Distributed Applications in Ad hoc Networks of Small Mobile Wireless Devices," tech. rep., Rochester Institute of Technology, IT Lab, 13 pages, May 22, 2001.

Li Li and Louise Lamont, "A Lightweight Service Discovery Mechanism for Mobile Ad Hoc Pervasive Environment Using Cross-Layer Design," *IEEE PerCom 2005*, 5 pages, Mar. 2005.

M. Storey, G. Blair, and A. Friday, "MARE: resource discovery and configuration in ad hoc networks," *Mobile Networks and Applications*, vol. 7, No. 5, pp. 377-387, 2002.

\* cited by examiner

SOFTWARE 1680 FOR TECHNOLOGY
DESCRIBED IN EXAMPLE(S)

PROVIDING LOCATION-BASED SERVICES VIA WIRELESS NETWORKS

BACKGROUND

With the increasing popularity of wireless networks and wireless devices, there is a growing need for providing location-specific information. While general information can easily be provided to all devices in a wireless network, providing information that is specific to the location of a particular wireless device can be difficult. Various specialized technologies have been developed in order to provide information that is specific to the location of a device. Specialized solutions have been developed, for example, based on GPS, signal strength, and triangulation technologies. However, such specialized technologies can be complex and costly to implement, and can require a significant investment in additional infrastructure.

For example, a specialized solution based on GPS technology would require that each wireless device include GPS technology. In addition to requiring GPS technology with the wireless devices, such a specialized solution could also require modification to the wireless network infrastructure to support the GPS technology.

Existing wireless networks can contain infrastructure and wireless devices that do not support specialized location-determination technology. Furthermore, existing wireless networks can have a significant investment in the existing infrastructure and devices. Because of the additional complexity and cost required to implement these specialized solutions, they can be impractical for use with existing wireless networks.

Therefore, there exists ample opportunity for improvement in technologies related providing location-based services using wireless networks.

SUMMARY

A variety of technologies related to providing location-based services (LBS) within wireless networks can be applied. For example, a system for providing location-based services within an ad-hoc wireless network zone can be provided. The system can comprise an information server configured to provide location-based services by broadcasting location-based information regarding the location-based services within the ad-hoc wireless network zone. The broadcast location-based information can be received by a client wireless device (e.g. within the zone or upon entering the zone). Location-based information can be broadcast using a wireless network adapter (e.g., of the information server), and received using a wireless network adapter (e.g., of the client wireless device).

Location-based services can be provided within an ad-hoc wireless network zone via an ad-hoc wireless network by broadcasting, within the ad-hoc wireless network zone, location-based information regarding the location-based services. The broadcast location-based information can be received by a client wireless device within the ad-hoc wireless network zone. The client wireless device can display alerts based on the received location-based information. The client wireless device can filter the received location-based information and display the alerts based on the filtered information.

Preferences can be entered by a user of a client wireless device and used to filter received location-based information for particular location-based services. Preferences can also be used to enable or disable location-based services.

A client wireless device can scan for wireless network zones providing location-based services, determine whether a detected wireless network zone provides location-based services, connect to the wireless network zone, listen for broadcast location-based information, capture the broadcast, filter the received location-based information (e.g., based on preferences), and display alerts based on the location-based information (e.g., based on the filtered received location-based information). A client wireless device can perform all or some of these functions automatically (e.g., without user intervention).

The foregoing and other features and advantages of the invention will become more apparent from the following detailed description, which proceeds with reference to the accompanying figures.

DETAILED DESCRIPTION OF EXEMPLARY EMBODIMENTS

Example 1

Exemplary Location-Based Services

Figure 1:
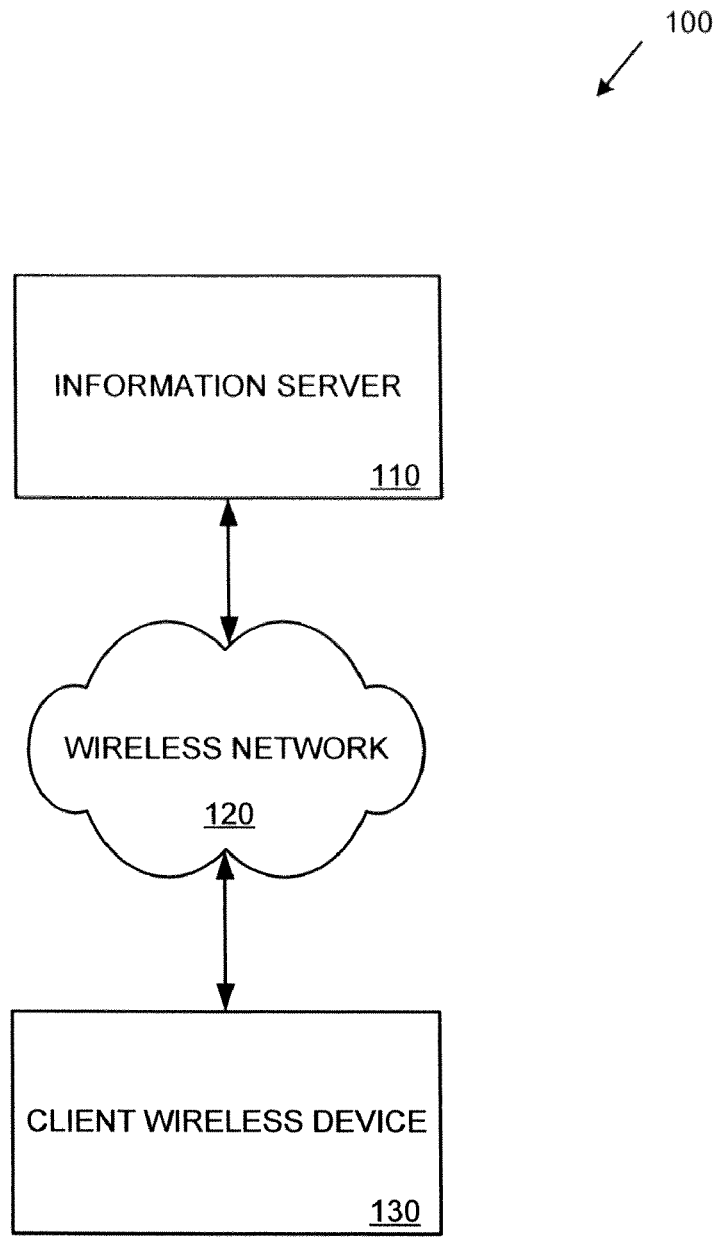
FIG. 1 is a diagram showing an exemplary system for providing location-based services.

In any of the examples herein, location-based services can be services (e.g., computer-related services) that are specific to, or have value based on, the location of a computing device and/or a user (e.g., a user operating a computing device). Location-based services can be provided to a user based on the user's physical (e.g., geographical) location. For example, location-based services can be services that provide information (e.g., location-based information) based on a user's proximity to a physical location (e.g., a user's proximity to a building or structure).

For example, a location-based service can be a service that broadcasts information regarding recently arrived books at a library. If a user walks near, or within, the library, the user can be notified, via the user's computing device, of the availability of one or more of the recently arrived books (e.g., based on preferences entered by the user). A location-based service can also, for example, broadcast information about special promotions (e.g., a sale at a store), thus notifying a user of the special promotions when the user ventures near the store.

Example 2

Exemplary Location-Based Information

In any of the examples herein, location-based information can be information provided by location-based services. Location-based information can be information that is relevant to, or has value based on, a specific location (e.g., a specific location of a user operating a computing device such as a client wireless device). For example, a library location-based service can broadcast location-based information regarding recently arrived books at the library. A store location-based service can broadcast location-based information regarding special promotions or sales occurring at the store. Users can receive the broadcast location-based information (e.g., via client wireless devices) when the users venture near, or within, the location (e.g., near or within the library or store).

Example 3

Exemplary XML Format

In any of the examples herein, location-based information can be provided in a variety of formats. For example, location-based information can be provided in a format defined by a mark-up language, such as XML. Location-based information can also be provided in other formats, such as plain text.

For example, location-based information can be provided in a pre-defined XML format that can contain location-based information for one or more location-based services. Location-based information can be broadcast in the pre-defined XML format by broadcasting an XML document in the pre-defined format. The following is an example XML broadcast in a pre-defined XML format containing example location-based information for providing location-based services:

```xml
<?xml version="1.0" encoding="utf-8"?>
<Lbs>
<Server>http://LbsServ2916d\\abst.jsp</Server>
<Location>B12 Education and Research Zone near
    Central Library</Location>
<LocationID>3</LocationID>
<Paging>Present</Paging>
<GroupIDAlerts>
    <gid>121</gid>
    <gid>231</gid>
</GroupIDAlerts>
<UserIDAlerts>
    <uid>567</uid>
    <uid>883</uid>
    <uid>924</uid>
</UserIDAlerts>
<Multicastserver>http://LbsServ2916d\\page.jsp
</Multicastserver>
<Map>http://LbsServ29106d\\ZoneMap.html</MAP>
<Service xmlns="Auditorium">
    <Audi>
        <Session>WIRELESS COMPUTING-PERVASIVE
            COMPUTING</Session>
        <Venue>AUDITORIUM 1</Venue>
        <Level>Advanced</Level>
        <Speaker>Mr. Gupta</Speaker>
        <Time>Friday 11th Nov 9:30AM</Time>
    </Audi>
    <Audi>
        <Session>WIRELESS LAN PROTOCOLS
        </Session>
        <Venue>AUDITORIUM 2</Venue>
        <Level>Advanced</Level>
        <Speaker>Mr. Murali</Speaker>
        <Time>Friday 11th Nov 9:30AM</Time>
    </Audi>
    ...
    <Audi>
</Service>
<Advertisements>
    <Ad>
        <Cat>Promotions</Cat>
        <AdId>1221</AdId>
        <Desc>Book Fair at Library, 20 to 50% off
            on Books, Tuesday 15th Nov</Desc>
    </Ad>
    <Ad>
        <Cat>Events</Cat>
        <AdId>521</AdId>
        <Desc>Celebrating the Petit Infoscion Day
            on 10th December</Desc>
        <url>http://LbsServ29106d\\events.jsp
        </url>
    </Ad>
</Advertisements>
</Lbs>
```

The example XML document above contains a variety of location-based information for a specific location-based service, the "Auditorium" location-based service. For the "Auditorium" location-based service, location-based information is provided for two specific auditorium events. Information regarding more than (or fewer than) two auditorium events can also be included. In addition, location-based information is provided for two specific auditorium advertisements related to the "Auditorium" location-based service.

In general, the XML document can include location-based information for a single location-based service, or for multiple location-based services. Limiting an XML document to a single location-based service can be advantageous. For example, a number of XML documents, each containing location-based information for a specific location-based service, can be broadcast by a corresponding number of specific network ports (and received via a corresponding number of specific network ports of a client wireless device). In this way, a client wireless device can be configured (e.g., via preferences) to enable or disable location-based services by listening or not listening to specific network ports (or capturing or not capturing the broadcast for one or more of the specific network ports).

In the example XML document above, a "Paging" tag is included. The "Paging" tag can indicate whether there is specific location-based information for a specific user and/or a specific group of users. Such specific location-based information for a user and/or group can be known as targeted location-based information. Using the "Paging" tag, a client wireless device receiving the XML document can determine whether there is specific information for a user and/or group (e.g., a specific user and/or group that has been configured as a preference by the user of the client wireless device) and decide whether to receive (e.g., capture) the remainder of the XML document (e.g., for the targeted information or for all information in the XML document), ignore the remainder of the XML document (e.g., turn off the client wireless device), or receive (e.g., capture) the remainder of the XML document for general location-based information that is not specific to a user and/or group.

If the "Paging" tag indicates a specific group of users (e.g., group "123"), it can indicate that location-based information for the specific group is present later in the XML document. The presence of the "Paging" tag indicating the specific group can also indicate that location-based information for the specific group is present at another location (e.g., available from an information server providing the location based service). In such a case, a client wireless device can retrieve (e.g., explicitly request or "pull") the location-based information for the specific group (e.g., request the information from the information server). By requiring client wireless devices to explicitly request, or "pull," targeted location-based information, bandwidth and computing resources can be conserved (e.g., for client wireless devices not concerned with the targeted location-based information).

When an XML document is received by a client wireless device, it can be validated against a standard XML schema.

Example 4

Exemplary Wireless Network

In any of the examples herein, a wireless network can be used to provide location-based services (e.g., by providing location-based information). A wireless network can be a wireless computer network. For example, a wireless network can be a Wi-Fi wireless network (a wireless network operated under the Wi-Fi IEEE 802.11 standard, such as 801.11a, 802.11b, 802.11g, 802.11n, etc.). Other types of wireless networks (e.g., other wireless network protocols and technologies) can also be used to provide location-based services, such as Bluetooth (IEEE 802.15), WiMAX (IEEE 802.16), and other wireless network technologies.

A wireless network can comprise various components. A wireless network can include wireless network adapters. For example, wireless network adapters can include wireless cards (e.g., Wi-Fi cards) in computers, PDAs, cell phones, smart phones, or other computing devices. Wireless network adapters can be built-in (e.g., a PDA with built-in, or integrated, wireless capability) or added (e.g., a laptop with a wireless network adapter card). Wireless network adapters can also include wireless access points when operated as adapters (e.g., in ad-hoc mode). A wireless network adapter can be operated, for example in infrastructure mode (e.g., with a central point through which all wireless traffic passes), or in ad-hoc mode (e.g., supporting peer-to-peer connections between wireless network adapters).

A wireless network can be operated in various modes. For example, a wireless network, such as a Wi-Fi wireless network, can be operated in ad-hoc mode. Ad-hoc mode can be a mode in which wireless network adapters communicate directly (e.g., peer-to-peer communication), without the need for a central access point in infrastructure mode.

A wireless network, such as a Wi-Fi wireless network, can be used to provide location-based services. For example, an existing wireless network can provide location-based services without requiring the use of additional location-determining hardware or infrastructure (e.g., GPS hardware or infrastructure). For example, a standard Wi-Fi network adapter can determine the location of another Wi-Fi network adapter as being within the wireless network zone based on the presence of the other Wi-Fi network adapter within communication range. In this way, a first Wi-Fi network adapter (e.g., a Wi-Fi network adapter of an information server) can determine the location of other Wi-Fi network adapters as being within the wireless network zone (within communication range) of the first Wi-Fi network adapter. This determination can be accomplished without requiring any additional hardware or infrastructure (e.g., it can be a capability of existing off-the-shelf wireless network adapters). For example, an information server can provide location-based services by broadcasting, via the first Wi-Fi network adapter (e.g., configured in ad-hoc mode), location-based information to Wi-Fi client wireless devices within the wireless network zone.

By using existing wireless networks, and existing wireless network components (e.g., wireless network adapters), location-based services can be provided (e.g., location-based services that provide location-based information within a specific wireless network zone, such as zone-specific location-based services). In this way, existing wireless networks, such as existing Wi-Fi wireless networks, can be used to provide location-based services without additional investment in hardware and infrastructure.

Example 5

Exemplary Wireless Network Zone

In any of the examples herein, a wireless network zone can be a zone created by a wireless network adapter. For example, a wireless network zone can be an area (e.g., a physical or geographic area) related to the communication range of a wireless adapter. For example, a wireless network adapter can have a range within which it can communicate with other wireless network adapters. For example, the range can cover an area with a 150 to 300 foot radius centered at the wireless network adapter. The range of a wireless network adapter can be affected by various conditions, such as environmental factors, transmission power, interference, and the like. A single wireless network zone can be associated with a single wireless network adapter. A wireless network zone can also be known as a hotspot.

Location-based services can be provided within a wireless network zone by broadcasting location-based information within the wireless network zone (e.g., via a wireless network adapter of the wireless network zone). Client wireless devices located within the wireless network zone can listen for, and receive, the broadcast location-based information.

A wireless network zone can be an ad-hoc wireless network zone (e.g., created by a wireless network adapter configured in ad-hoc mode). Client wireless devices can connect to the ad-hoc wireless network by connecting via wireless network adapters configured in ad-hoc mode.

Location-based services can be provided within a wireless network zone other than by broadcasting location-based information. For example, a user with a client wireless device can actively request (e.g., query) for location-based information (e.g., from an information server). For example, a user with a wireless device can be walking through an airport. If the user enters a wireless network zone providing location-based services, the user can use the client wireless device (e.g., by running an application, such as a web browser) and request specific information (e.g., search for the location of a currency exchange service within the airport).

Example 6

Exemplary Zone-Specific Location-Based Services

In any of the examples herein, zone-specific location-based services can be location-based services that are provided within a specific wireless network zone. For example, a specific location, such as a building, can be served by a wireless network zone. Location-based services that are specific to the location (e.g., specific to the building) can be provided within the wireless network zone.

Zone-specific location-based services can be provided only within the corresponding wireless network zone. An example of a zone-specific location-based service is a library service that is provided only within the wireless network zone of the library.

Example 7

Exemplary Client Wireless Device

In any of the examples herein, a client wireless device can be a computing device that is capable of wireless communication. For example, a client wireless device can be a computer (e.g., a laptop, desktop, or tablet computer), a PDA, a mobile communications device (e.g., a cell phone or a smart phone), or another type of computing device with a built-in or add-on wireless network adapter (e.g., a Wi-Fi wireless network adapter). For example, a client wireless device can be a laptop or PDA with an 802.11b or 802.11g wireless network adapter. Client wireless devices can be mobile or stationary. For example, a user can carry a client wireless device to various locations (e.g., by walking with a PDA to various locations on a corporate campus or by driving to various locations within a city).

Location-based services can be provided to client wireless devices. Client wireless devices can receive location-based information regarding location-based services. For example, a client wireless device can be provided location-based services due to the location of the device within a specific wireless network zone.

Client wireless devices can scan (e.g., continuously scan) for wireless network zones providing location-based services. Scanning can be automatic (e.g., a client wireless device can continuously scan without any intervention by the user). Client wireless devices can detect wireless network zones providing location-based services (e.g., based on the SSID of the wireless network zone). Detecting can be performed automatically by the client wireless device (e.g., without any user intervention). Client wireless devices can connect to wireless network zones (e.g., to those zones providing location-based services) and receive broadcast location-based information (e.g., by listening on network ports). Connecting and/or receiving can be performed automatically by the client wireless device (e.g., without any user intervention). Client wireless devices can filter received location-based information and display alerts (e.g., to a user of the client wireless device). Filtering and displaying alerts can be performed automatically by the client wireless device (e.g., without any user intervention).

A client wireless device can perform multiple functions (e.g., a sequence of functions) automatically. For example, a client wireless device can automatically scan for wireless network zones providing location-based services, determine whether detected zones provide location-based services, connect, filter received location-based information, and display alerts. A client wireless device can perform all of these functions automatically (e.g., without user intervention). Some or all of these functions can also be performed manually (e.g., with user intervention).

A client wireless device can include software (e.g., a software program or module) allowing the client wireless device to perform various functions in order to receive and utilize location-based information. For example, the software can allow the client wireless device to scan for wireless network zones, detect whether the wireless network zones provide location-based services, connect to the wireless network zones, receive broadcast location-based information, and display alerts based on the received location-based information. The software can also allow the client wireless device to filter received location-based information based on various preferences or configuration settings.

Example 8

Exemplary Preferences

In any of the examples herein, preferences can be used by a client wireless device to filter location-based information. Preferences can be stored at a client wireless device (e.g., stored in a memory device of the client wireless device). Preferences can be entered by a user of a client wireless device. Preferences can be used to personalize location based services.

Preferences can be used to enable or disable location based services. For example, the user of a client wireless device can enter, at the client wireless device, a preference to enable a specific location-based service. When the client wireless device receives broadcast location-based information relating to the enabled location-based service, the client wireless device can display alerts based on the location-based information.

A user of the client wireless device can also enter a preference to disable a specific location-based service. When the client wireless device receives broadcast location-based information relating to the disabled location-based service, the client wireless device can ignore or disregard the location-based information, or a portion of the location-based information, related to the disabled location-based service. Using this technique, a client wireless device can, for example, only display alerts related to a location-based service if a user of the client wireless device has configured a preference enabling the location-based service. For example, if a user does not want to receive alerts related to an advertising location-based service, the user can set a preference disabling the advertising location-based service.

Preferences can also be used to define filtering parameters within location-based services. Preferences can be used to filter location-based information based on a specific type or category of information. For example, if a user has enabled an "advertising" location-based service, the user may be able to configure additional preferences for the "advertising" location-based service, such as specific types of advertising information that the user is interested in receiving (e.g., advertising information related to clothing, shoes, discounts, sales, or other types or categories of information). Similarly, a user can configure preferences based on other types or categories of information (e.g., specific types of books, specific types of events, breaking news, weather updates, traffic reports, etc.).

Preferences can be used to filter location-based information based on a specific group of users. For example, an organization can define various groups for its employees (e.g., accounting, administration, engineers, IT, etc.). If a user has enabled an "announcements" location-based service, the user may be able to select a group (e.g., accounting). Then, when the user receives location-based information from the "announcements" location-based service, the user's client wireless device can filter the location-based information and only display alerts targeted to the accounting group. Similarly, preferences can be used to filter location-based information based on a specific user.

Example 9

Exemplary Information Server

In any of the examples herein, an information server can be a computing device (e.g., a computer server, network appliance, or the like) that provides location-based services. An information server can provide location-based services to one or more wireless network zones. An information server can provide one, or more than one, location-based service per wireless network zone.

An information server can provide location-based services to a wireless network zone using a wireless network adapter. The information server can be located at the wireless network adapter (e.g., proximate to the wireless network adapter), or located remotely from the wireless network adapter. For example, an information server, such as a computer server comprising a wireless network adapter card, can provide one or more location-based services within the wireless network zone of the wireless network adapter card.

An information server can also be located remotely. For example, an information server, such as a computer server, can be located remotely from one or more wireless network adapters via an IP network (e.g., a wired IP network). Each of the remotely located wireless network adapters can serve its respective wireless network zone. The information server can then provide any number of location-based services to the wireless network zones of the remotely located wireless network adapters by communicating with the remotely located wireless network adapters (e.g., over the IP network). The information server can provide location-based services that span more than one wireless network zone, or the information server can provide zone-specific location based services that are specific to one of the wireless network zones.

An information server can provide location-based services by broadcasting location-based information within wireless network zones. An information server can continuously broadcast (e.g., on an interval basis, such as every 10 seconds) location based information.

An information server can be dedicated to primarily providing location-based services. Such an information server can, for example, be a stand-alone information server (e.g., not connected to communication devices other than a wireless network adapter). For example, a dedicated stand-alone information server can be installed at a location (e.g., a shopping mall) without a communication infrastructure (e.g., without Internet or LAN access) and provide location-based services, to client wireless devices, by broadcasting location-based information via a wireless network adapter.

An information server can also provide other services in addition to location-based services. For example, an information server can be web server connected to the Internet that also provides location-based services, to client wireless devices, by broadcasting location-based information via a wireless network adapter.

Example 10

Exemplary Broadcasting Location-Based Information

In any of the examples herein, location-based services can be provided by broadcasting location-based information. For example, an information server can provide location-based services by broadcasting location-based information. Location-based information can be broadcast within a single wireless network zone, or across multiple wireless network zones. Zone-specific location-based services can be provided by broadcasting location-based information within a specific wireless network zone. Broadcasting location-based information can be known as "pushing" location-based information.

Location-based information can be broadcast (e.g., via an information server using a wireless network adapter) continuously (e.g., on an interval basis, such as every 10 seconds). Location-based information can also be broadcast at other times, such as when a client wireless device requests the broadcast.

Location-based information can be broadcast using a variety of network protocols. Location-based information can be broadcast using, for example, the UDP network protocol. For example, location-based information can be broadcast to a specific IP subnet using the UDP protocol.

Location-based services can be broadcast within an ad-hoc wireless network zone using a wireless network adapter configured in ad-hoc mode.

Location-based services can be broadcast via a wireless network adapter configured with a specific (e.g., pre-determined) SSID (service set identifier). Using a specific SSID, or a specific format of SSID (e.g., an SSID beginning with a specific character string), can allow client wireless devices to detect the presence of location-based services provided by wireless network zones associated with the specific SSID.

Example 11

Exemplary Alerts

In any of the examples herein, alerts can be displayed on client wireless devices. Alerts can be displayed when the client wireless device receives broadcast location-based information. Alerts can be displayed after filtering received location-based information using preferences.

Alerts can be displayed in a variety of formats. For example, an alert can be a pop-up window on a display of a client wireless device. An alert can also be a bubble notification. Alerts can also include other techniques of notification, such as an audible notification (e.g., an audible beep or ring) or a visual notification (e.g., a blinking or flashing light).

Alerts can contain a variety of information. For example, an alert can contain text, pictures, multimedia (e.g., audio and video), links (e.g., links to Web sites), and other types of information.

Example 12

Exemplary System for Providing Location-Based Services

FIG. 1 shows an exemplary system 100 for providing location based services. In the example system, an information server 110 provides location-based services to a client wireless device 130 via a wireless network 120. For example, the information server 110 can provide location-based services using a wireless network adapter (e.g., a wireless network adapter located at the information server, or a remotely located wireless network adapter). The information server 110 can provide location-based services by broadcasting location-based information within a wireless network zone of the wireless network adapter.

The wireless network 120 can be a Wi-Fi wireless network. The wireless network 120 can be generated by a wireless network adapter of the information server 110 and can encompass a wireless network zone. The wireless network 120 can be an ad-hoc wireless network.

For example, the information server 110 can comprise a wireless network adapter configured in ad-hoc mode. The information server 110 can provide location-based services by broadcasting, via the wireless network adapter, location-based information. The client wireless device 130 can also comprise a wireless network adapter configured in ad-hoc mode. The client wireless device 130 can connect to the wireless network 120 in ad-hoc mode (e.g., to the wireless network adapter of the information server 110) and receive the broadcast location-based information.

The system 100 can be a wireless network infrastructure comprising one or more information servers (e.g., information server 110) providing location-based services to one or more client wireless devices (e.g., client wireless device 130) by broadcasting location-based information within one or more wireless network zones via one or more wireless network adapters.

Example 13

Exemplary Method for Providing Location-Based Services

Figure 2:
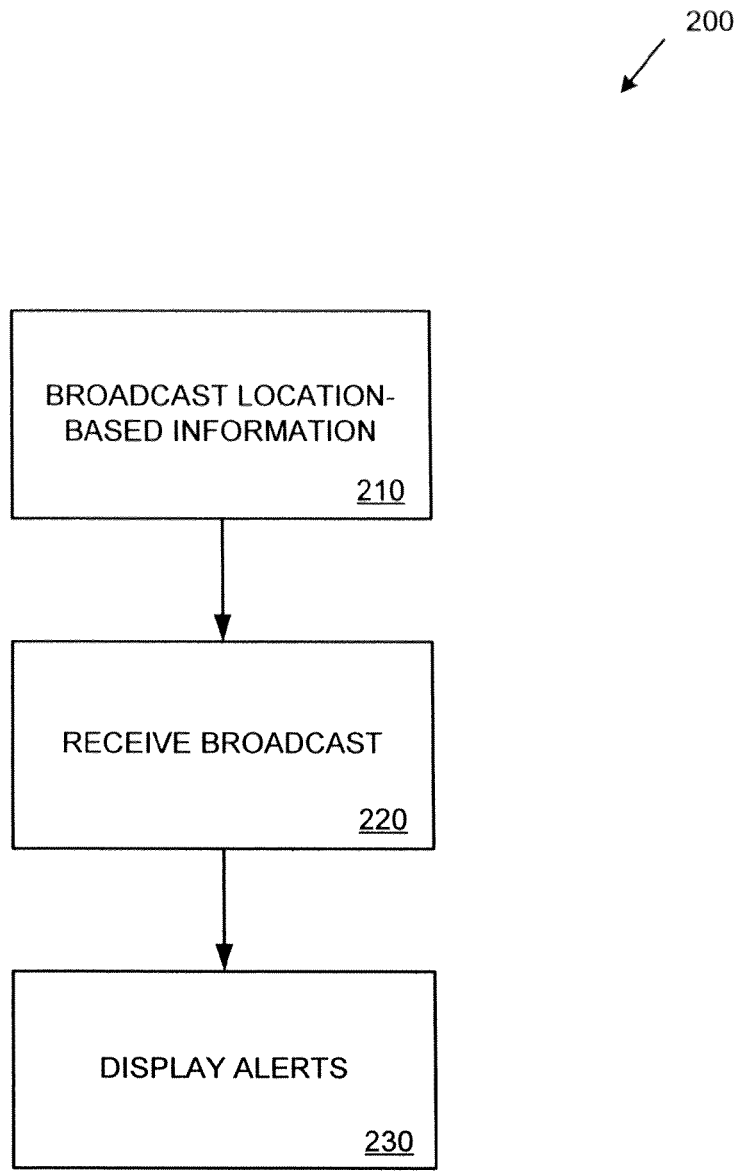
FIG. 2 is a flowchart showing an exemplary method for providing location-based services.

FIG. 2 shows an exemplary method 200 for providing location-based services by broadcasting location-based information, and can be performed, for example, by a system such as that shown in FIG. 1, 3, 4, or 6. At 210, location-based information is broadcast (e.g., by an information server). The location-based in information can be broadcast within an ad-hoc wireless network zone. The location-based information can be broadcast in an XML document in an XML format.

At 220, the broadcast location-based information is received (e.g., by a client wireless device). For example, a client wireless device can connect to an ad-hoc wireless network and listen for broadcast location-based information on various network ports. When the client wireless device detects the broadcast location-based information, the client wireless device can receive (e.g., capture) the location-based information (e.g., receive an XML document containing the location-based information). The received location-based information can be filtered according to user-defined preferences (e.g., preferences entered by a user of a client wireless device).

At 230, alerts are displayed (e.g., at a client wireless device) based on the received location-based information. Alerts can be displayed based on received location-based information that has been filtered according to various preferences.

For example, the location-based information can be broadcast via a wireless network adapter of an information server configured in ad-hoc mode. The broadcast location-based information can be received via a second wireless network adapter of a client wireless device also configured in ad-hoc mode, and connected to the wireless network adapter of the information server. The client wireless device can then display alerts based on the received location-based information.

Example 14

Figure 3:
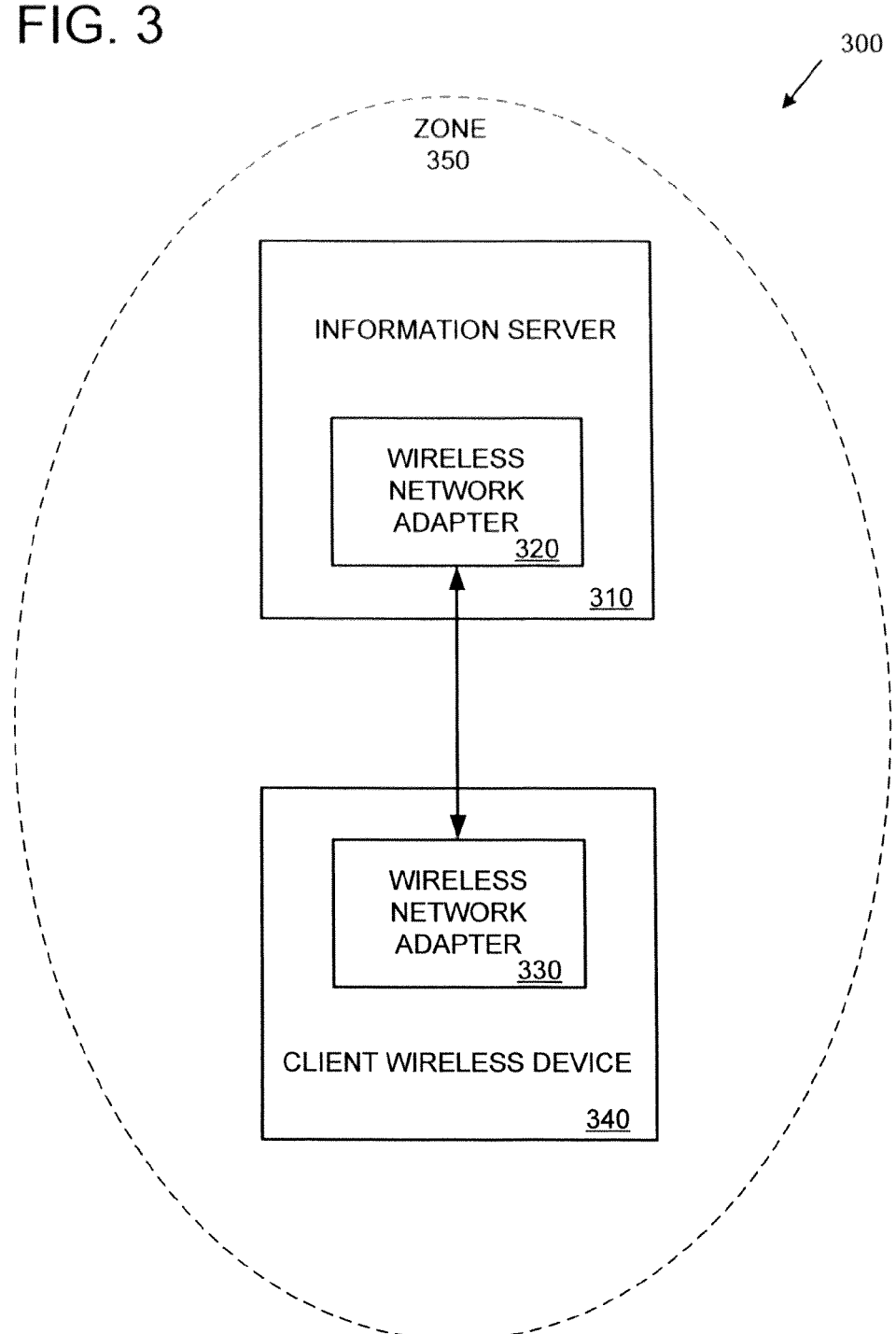
FIG. 3 is a diagram showing an exemplary system for providing location-based services within a wireless network zone.

Exemplary System for Providing Location-Based Services for a Wireless Network Zone FIG. 3 shows an exemplary system 300 for providing location-based services within a wireless network zone. In the example system, an information server 310 comprises a wireless network adapter 320. The wireless network adapter 320 is located at the information server 310 (e.g., a wireless network adapter integrated with the information server, an add-on wireless network adapter card, or a wireless network adapter located proximate to the information server). The wireless network adapter 320 could also be located remotely from the information server 310 without affecting the functionality of the example system 300.

Using the wireless network adapter 320, the information server 310 can provide location based services within the wireless network zone 350 created by the wireless network adapter 320. The wireless network zone 350 can be defined by the communication range of the wireless network adapter 320.

The information server 310 can provide location-based services by broadcasting location-based information via the wireless network adapter 320 to one or more client wireless devices located within the wireless network zone 350. In the example, the client wireless device 340 can receive broadcast location-based information from the information server 310 via the wireless network adapter 330 of the client wireless device 340. The client wireless device 340 can comprise the wireless network adapter 330 (e.g., a wireless network adapter integrated with the client wireless device, an ad-on wireless network adapter card, or a wireless network adapter located proximate to the client wireless device).

The wireless network adapter 320 of the information server 310 can be configured in ad-hoc mode, and the information server 310 can provide location-based services by broadcasting location-based information within the ad-hoc wireless network zone 350 via the ad-hoc wireless network created by the wireless device 320. Similarly, the wireless network adapter 330 of the client wireless device 340 can be configured in ad-hoc mode.

The information server 310 can provide location-based services by continuously broadcasting location-based information within the wireless network zone 350. The client wireless device 340 can receive the broadcast when (e.g., only when) the client wireless device 340 enters the wireless network zone 350. For example, the client wireless device 340 can continuously scan, via the wireless network adapter 330, for wireless network zones providing location-based services (e.g., based on an SSID of a wireless network adapter of the wireless network zone). When the client wireless device 340 enters a wireless network zone and determines that it provides location-based services, the client wireless device 340 can connect to a wireless network adapter of the wireless network zone (e.g., wireless network adapter 320 of wireless network zone 350). Once connected, the client wireless device 340 can listen for broadcasts (e.g. listen on one or more network ports, where the ports correspond to location-based services). If the client wireless device 340 detects broadcast location-based information the client wireless device 340 can receive the broadcast location-based information (e.g., capture the location-based information) and, for example, display alerts (e.g., after filtering the received location-based information based on preferences).

Example 15

Figure 4:
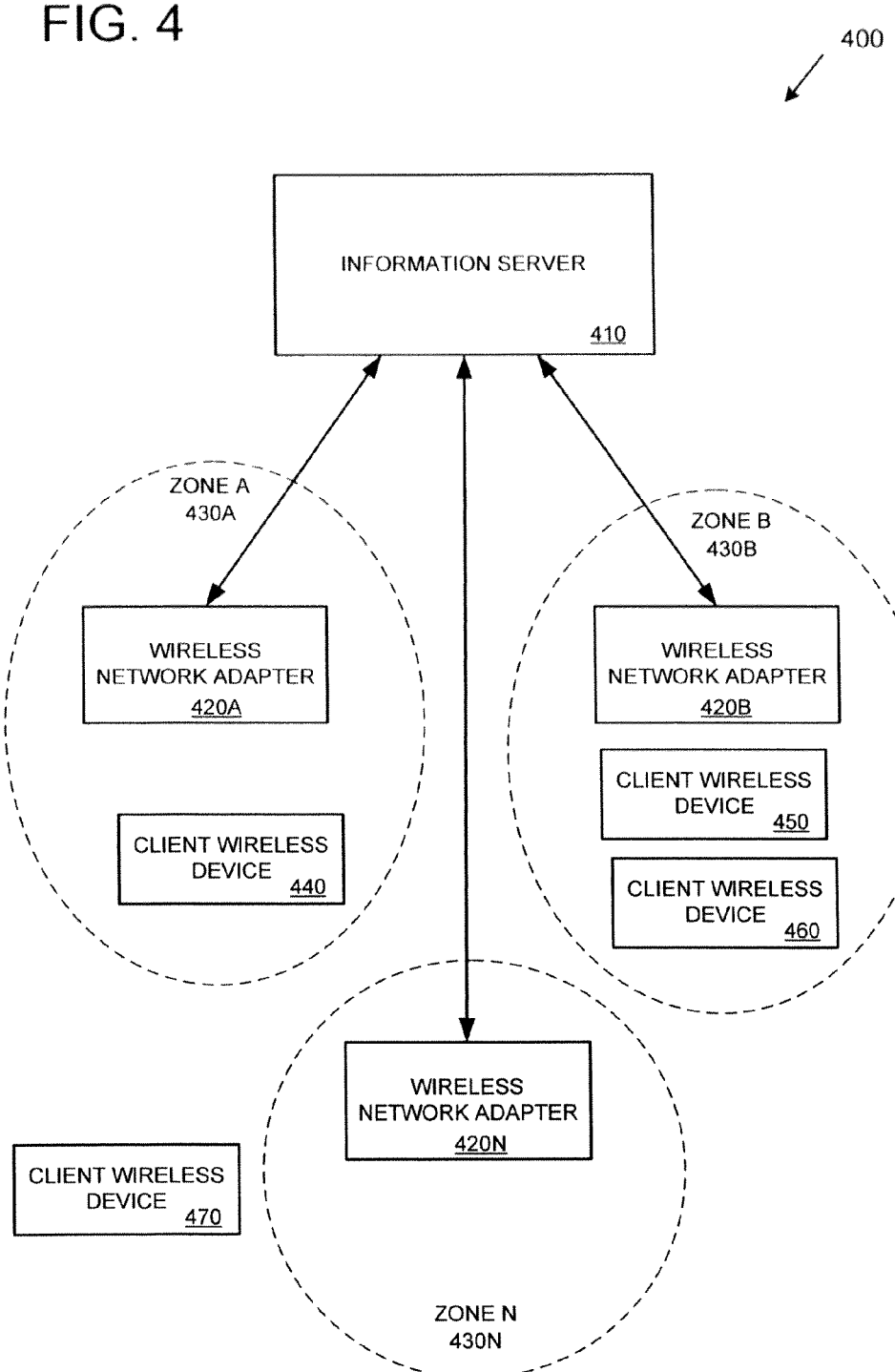
FIG. 4 is a diagram showing an exemplary system for providing location-based services within multiple wireless network zones.

Exemplary System for Providing Location-Based Services for Multiple Wireless Network Zones FIG. 4 shows an exemplary system 400 for providing location-based services within multiple wireless network zones. In the example system, an information server 410 provides location-based services using multiple wireless network adapters 420A-N. Each wireless network adapter (e.g., 420A, 420B, and 420N) is associated with a respective wireless network zone (e.g., wireless network adapter 420A is associated with wireless network zone 430A, wireless network adapter 420B is associated with wireless network zone 430B, and wireless network adapter 420N is associated with wireless network zone 430N). The information server 410 in the example system 400 is located remotely from the wireless network adapters 420A-N. For example, the information server 410 can communicate over an IP network (e.g., a wired or wireless IP network) connecting the information server 410 to the wireless network adapters 420A-N. In this way, the information server 410 can provide location-based services to an arbitrary number of wireless network zones using an arbitrary number of wireless network adapters.

The information server 410 can provide location-based services by broadcasting (e.g., continuously broadcasting) location-based information within the wireless network zones 430A-N using the wireless network adapters 420A-N. For example, wireless network adapters 420A-N can be configured in ad-hoc mode, and the information server 410 can provide location-based services by broadcasting location-based information within the ad-hoc wireless network zones 430A-N via the ad-hoc wireless networks created by the wireless network adapters 420A-N configured in ad-hoc mode. Similarly, client wireless devices (comprising wireless network adapters configured in ad-hoc mode) can receive the broadcast location based information. For example, client wireless device 440 can receive broadcast location-based information from the information server 410 via a wireless network adapter (not pictured), configured in ad-hoc mode, of the client wireless device 440.

For example, the information server 410 can provide location-based services by continuously broadcasting location-based information within the wireless network zones 430A-N. Client wireless devices can receive the broadcast when (e.g., only when) the client wireless devices enter one of the wireless network zones 430A-N. For example, client wireless device 440 can receive the broadcast within wireless network zone 430A. Client wireless devices 450 and 460 can receive the broadcast within wireless network zone 430B. However, client wireless device 470 cannot receive the broadcast within wireless network zone 430N because it is not within the zone (e.g., it is outside the range of wireless network adapter 420N).

A client wireless device (e.g., 440, 450, 460, or 470) can scan (e.g., continuously scan), via a wireless network adapter of the client wireless device, for wireless network zones providing location-based services (e.g., based on an SSID of a wireless network adapter of the wireless network zone). When the client wireless device (e.g., 440, 450, 460, or 470) enters a wireless network zone and determines that it provides location-based services, the client wireless device (e.g., 440, 450, 460, or 470) can connect to a wireless network adapter of the wireless network zone (e.g., wireless network adapter 420A of wireless network zone 430A). Once connected, the client wireless device (e.g., 440, 450, 460, or 470) can listen for broadcasts (e.g., listen on one or more network ports, where the ports correspond to location-based services). If the client wireless device (e.g., 440, 450, 460, or 470) detects broadcast location-based information, the client wireless device (e.g., 440, 450, 460, or 470) can receive the broadcast location-based information (e.g., capture the location-based information) and, for example, display alerts (e.g., after filtering the received location-based information based on preferences).

The location-based services provided by the information server 410 can be provided within one wireless network zone, or within multiple wireless network zones. For example, a specific location-based service can be provided only within a specific wireless network zone (e.g., 430A) by broadcasting location-based information regarding the specific location-based service only within the specific wireless network zone (e.g., 430A). Location-based services that are provided only within a single wireless network zone can be known as zone-specific location-based services. An example of a zone-specific location-based service can be a library location-based service where the library location-based service is only provided within the library wireless network zone.

A specific location-based service can also be provided within multiple (e.g., an arbitrary number of) wireless network zones (e.g., 430A, 430B, and 430N) by broadcasting location-based information regarding the specific location-based service within the multiple wireless network zones (e.g., 430A, 430B, and 430N). An example of a specific location-based service provided within multiple wireless network zones can be an announcement service provided within the wireless network zones of a business, organization, or other type of location.

The example system 400 can be a system for providing location-based services for a business or organization. For example, the system 400 can provide location-based services for a business campus comprising multiple buildings (e.g., at a single business location, or at multiple business locations). For example, wireless network adapter 420A can be located in one building of the business campus and provide location-based services to client wireless devices (e.g., client wireless device 440) within the wireless network zone 430A of wireless network adapter 420A. The wireless network zone 430A can cover, for example, the building and the surrounding area (e.g., the immediately surrounding area). Similarly, wireless network adapters 420B and 420N can be located in different buildings of the business campus and provide location-based services to client wireless devices within their respective wireless network zones.

Location-based services can also be provided for other types of locations using the example system 400 (e.g. college campus, shopping mall, airport, grocery store, park, road, or any other type of location).

Example 16

Figure 5:
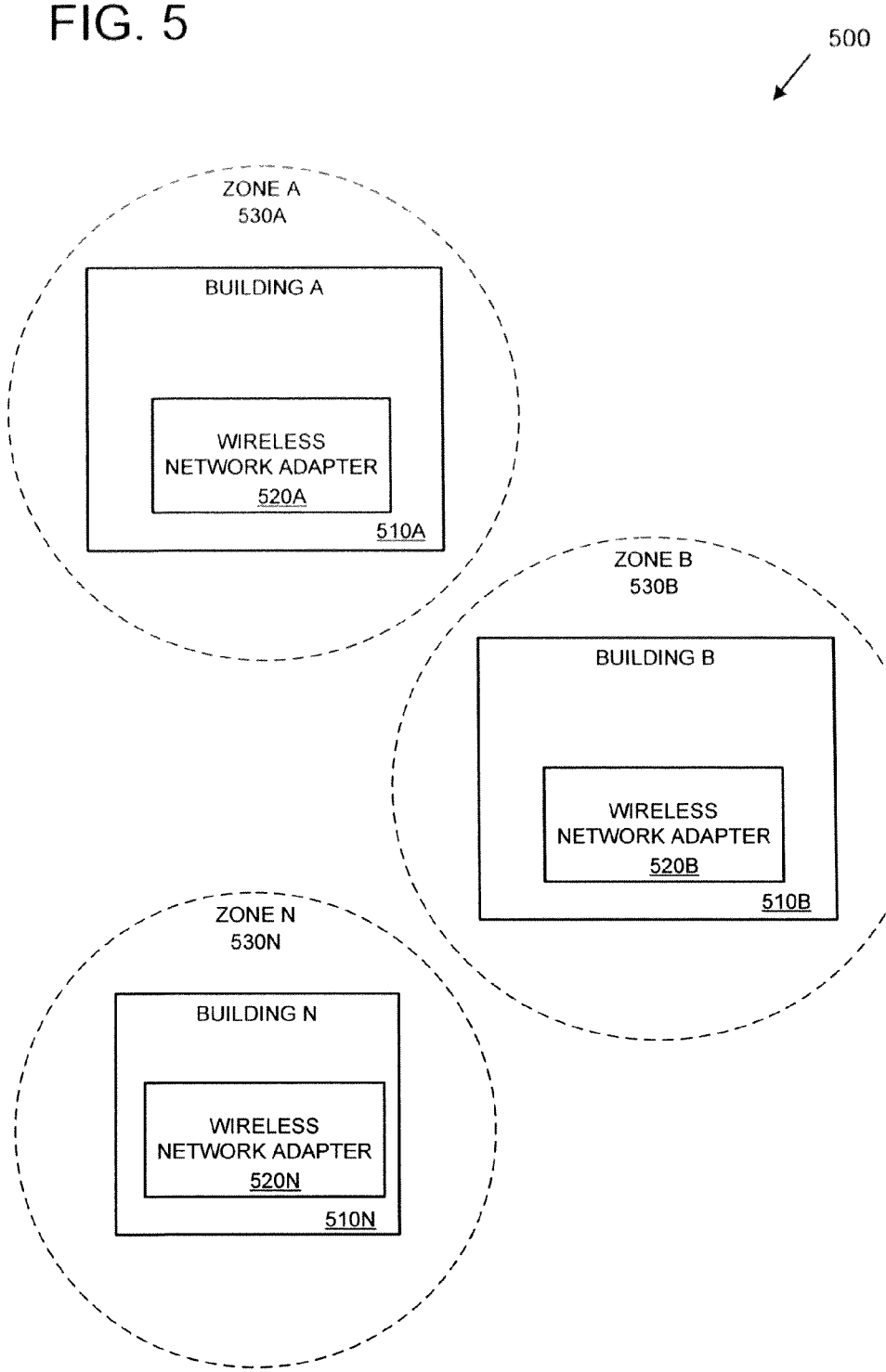
FIG. 5 is a diagram showing an exemplary system for providing location-based services within multiple wireless network zones.

Exemplary System for Providing Location-Based Services for Multiple Wireless Network Zones at One or More Areas FIG. 5 shows an exemplary system 500 for providing location-based services within multiple wireless network zones at one or more areas. In the example system 500, location-based services are provided within multiple (e.g., an arbitrary number of) wireless network zones (e.g., 530A-N). In the example system, each wireless network zone 530A-N is associated with a respective wireless network adapter 520A-N.

For example, each wireless network adapter 520A-N can be located at a different physical location, such as a building. Wireless network adapters can also be located at other physical locations. For example, wireless network adapters can be located at different locations within a single building, such as different rooms or floors within the building (e.g., to provide coverage to different areas of the building). Wireless network adapters can also be located outside of a building or structure (e.g., in an open area to provide coverage, for example, to a park).

The wireless network adapters (e.g., 520A-N) can be located, for example, in various buildings at a single location (e.g., a business campus). The wireless network adapters (e.g., 520A-N) can also be located at various distributed locations (e.g., various remote offices of a business or organization).

In the example system 500, wireless network adapter 520A is located in building 510A, thus allowing location-based services to be provided within wireless network zone 530A. For example, building 510A can be the library building of a business campus. Accordingly, library location-based services can be provided within wireless network zone 530A by broadcasting location-based information using wireless network adapter 520A.

Wireless network adapter 520B is located in building 510B, thus allowing location-based services to be provided within wireless network zone 530B. For example, building 510B can be the auditorium building of the business campus. Accordingly, auditorium location based services can be provided within wireless network zone 530B by broadcasting location-based information using wireless network adapter 520B.

Wireless network adapter 520N is located in building 510N, thus allowing location-based services to be provided within wireless network zone 530N. For example, building 510N can be the administration building of the business campus. Accordingly, administration location-based services can be provided within wireless network zone 530N by broadcasting location-based information using wireless network adapter 520N.

The example system 500 can provide location-based services using an information server (not shown) which broadcasts location-based information within the wireless network zones 530A-N via the respective wireless network adapters 520A-N. Providing the location-based services can be accomplished using one or more information servers. For example, a different information server can be located with each wireless network adapter 520A-N (e.g., in the example system 500, there could be three information servers, one located near each wireless network adapter within each building). A single information server could also be used. For example, the single information server could be located remotely from the wireless network adapters 520A-N and communicate with the wireless network adapters via an IP network.

Each of the wireless network zones 530A-N can provide location-based services to multiple (e.g., an arbitrary number of) client wireless devices within the wireless network zones 530A-N.

Example 17

Exemplary System for Broadcasting and Receiving Location-Based Information

Figure 6:
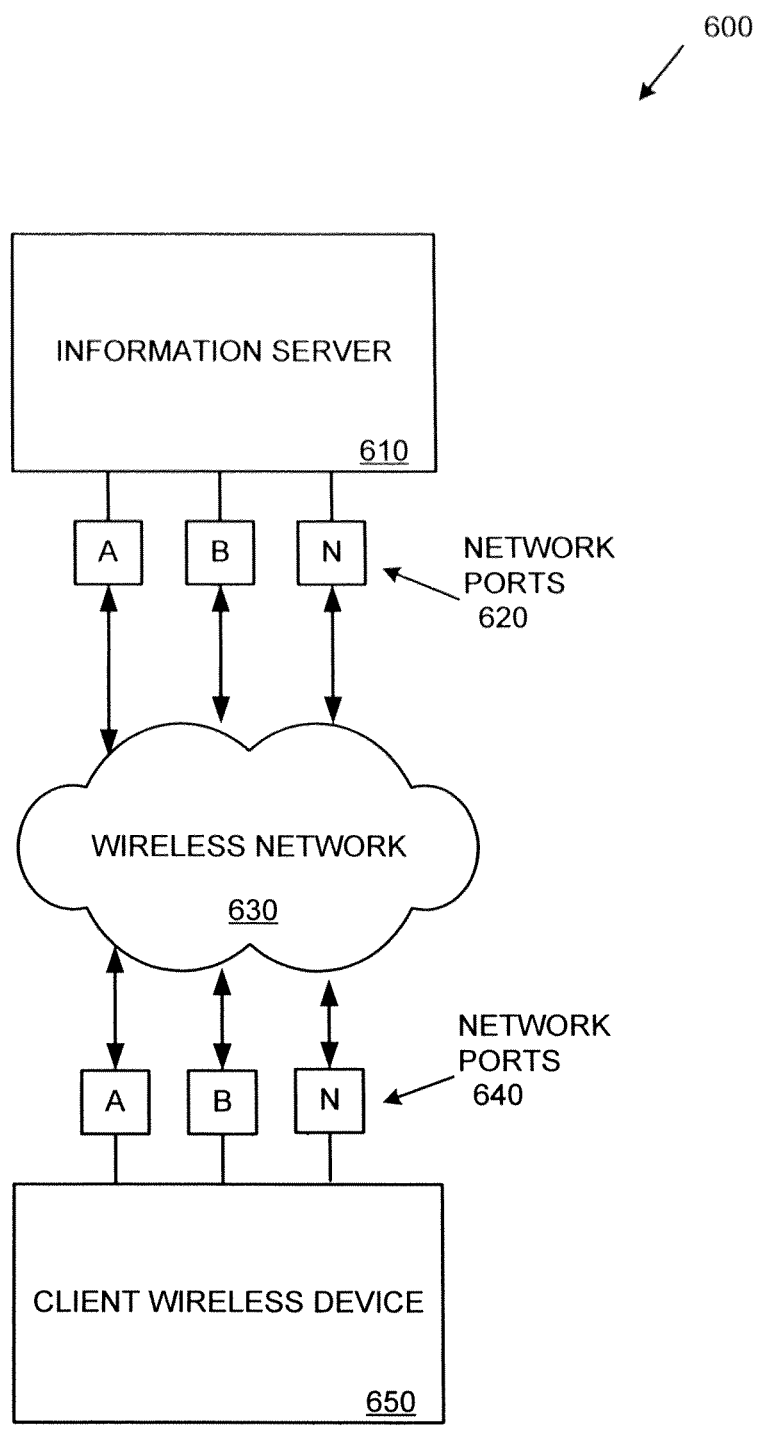
FIG. 6 is a diagram showing an exemplary system for broadcasting and receiving location-based information.

FIG. 6 shows an exemplary system 600 for providing location-based services by broadcasting and receiving location-based information. In the example system 600, an information server 610 provides location-based services by broadcasting location-based information. For example, the information server 610 can broadcast the location-based information within an ad-hoc wireless network zone via a wireless network adapter configured in ad-hoc mode.

The information server 610 provides location-based services by broadcasting, over the wireless network 630, location-based information via a number (e.g., an arbitrary number) of network ports 620. For example, each location-based service can be associated with a specific network port (e.g., a specific network port number). The information server 610 can then provide a specific location-based service by broadcasting location-based information for the specific location-based service using a specific network port.

The client wireless 650 receives location-based information broadcast by the information server 610. The client wireless device 650 can receive the location-based information by listening on a number (e.g., an arbitrary number) of network ports 640 (e.g., listening using network sockets). For example, the client wireless device 650, for each location-based service, can listen on a specific network port (e.g., a specific network port number) associated with the specific location-based service.

For example, the information server can broadcast (e.g., continuously broadcast) location-based information for a specific location-based service on network port "A" (one of the three network ports depicted at 620). The client wireless device 650 can be listening (e.g., continuously listening) on network port "A" (one of the three network ports depicted at 640) for the broadcast location-based information for the specific location-based service. When client wireless device 650 detects the broadcast on network port "A", the client wireless device 650 can receive (e.g., capture) the broadcast location-based information.

The information server 610 can broadcast location-based information within an ad-hoc wireless network zone using the UDP protocol (the User Datagram Protocol of the Internet Protocol suite), and the client wireless device 650 can receive the broadcast location-based information using the UDP protocol. The information server 610 can broadcast using specific UDP port numbers (e.g., each location-based service can be broadcast from a specific UDP source port number to a specific UDP destination port number). For example, network port "A" 620 can correspond to UDP port number "120," and network port "A" 640 can correspond to UDP port number "120." Port number "120" can correspond to a specific location-based service, such as a library location-based service. Similarly, network port "B" can correspond to UDP port number "130" (e.g., an auditorium location-based service), and network port "N" can correspond to UDP port number "140" (e.g., a general announcements location-based service).

Different port numbers can also be used for the information server 610 side and the client wireless device 650 side. For example, network port "A" 620 (e.g., the "broadcasting" side) can correspond to UDP port number "120," and network port "A" 640 (e.g., the "receiving" side) can correspond to UDP port number "121."

The specific port numbers corresponding to specific location-based services can be known to the information server 610 and the client wireless device 650. As a result, the information server 610 and client wireless device 650 can know which network port numbers on which to listen for specific location-based services. For example, the information server 610 and client wireless device 650 can know that the library location-based service will be broadcast on network port "120" (e.g., the source port) to network port "120" (e.g., the destination port).

The client wireless device 650 can listen on network ports based on preferences. For example, a user of the client wireless device 650 can enter a preference to enable two specific location-based services (e.g., location-based services associated with network ports "A" and "B" 640), and disable a third location-based service (e.g., location-based service associated with network port "N" 640). As a result, the client wireless device 650 can only listen for a broadcast on network ports "A" and "B," and ignore (e.g., not listen) for a broadcast on network port "N.")

Example 18

Exemplary Method for Receiving and Displaying Location-Based Information

Figure 7:
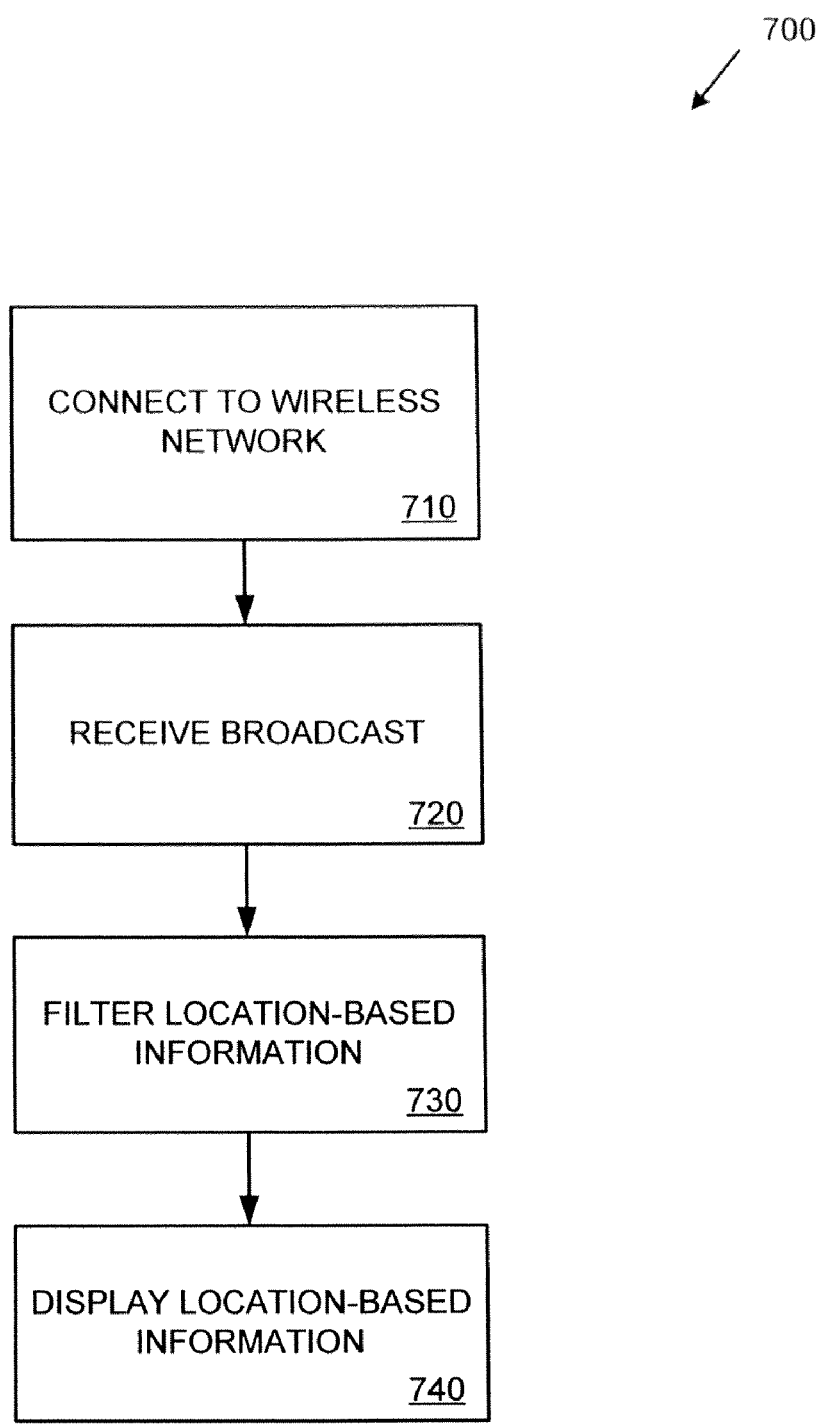
FIG. 7 is a flowchart showing an exemplary method for receiving and displaying location-based information.

FIG. 7 shows an exemplary method 700 for receiving and displaying location-based information, and can be performed, for example, by a system such as that shown in FIG. 1, 3, 4, or 6. At 710, a connection is made to a wireless network (e.g., to a wireless network adapter of the wireless network). The connection can be an ad-hoc wireless connection to an ad-hoc wireless network. For example, the connection can be made by a client wireless device using a wireless network adapter configured in ad-hoc mode.

At 720, broadcast location-based information is received. For example, the location-based information can be received by a client wireless device from an information server. The location-based information can be received as an XML document in an XML format.

At 730, the received location-based information is filtered. For example, the received location-based information can be filtered based on one or more preferences (e.g., user-defined preferences). The filtering can be performed by a client wireless device, and the preferences can be entered by a user of the client wireless device.

At 740, location-based information is displayed. For example, the location-based information can be displayed at a client wireless device by displaying one or more alerts based on the filtered received location-based information. An example of an alert can be seen in FIGS. 12, 13B, and 14B.

Example 19

Exemplary Method for Connecting to an Ad-Hoc Wireless Network

Figure 8:
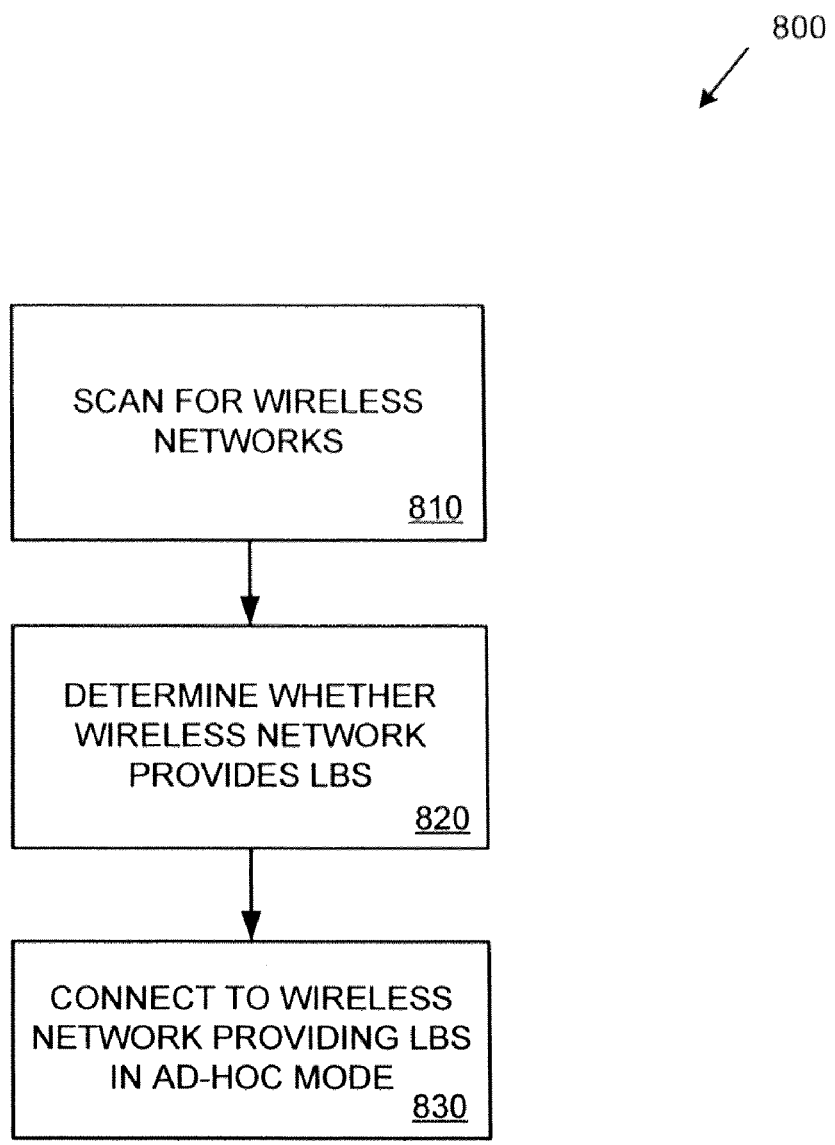
FIG. 8 is a flowchart showing an exemplary method for connecting to an ad-hoc wireless network.

FIG. 8 shows an exemplary method 800 for connecting to an ad-hoc wireless network providing location-based services, and can be performed, for example, by a system such as that shown in FIG. 1, 3, 4, or 6. At 810, scanning is conducted for ad-hoc wireless networks (e.g., a wireless network generated by a wireless network adapter, configured in ad-hoc mode, providing location-based services by broadcasting location-based information). For example, a client wireless device, with a wireless network adapter configured in ad-hoc mode, can scan (e.g., continuously scan) for ad-hoc wireless networks.

At 820, once the scanning 810 detects an ad-hoc wireless network, a determination is made whether the wireless network provides location-based services. The determination can be made based on the SSID of the detected ad-hoc wireless network (e.g., by an SSID of a wireless network adapter of the detected ad-hoc wireless network). For example, if the detected ad-hoc wireless network has a specific SSID (e.g., "LocationBasedService"), it can be determined that the detected ad-hoc wireless network provides location-based services. Other SSIDs can also indicate the presence of location-based services (e.g., "LBS-1," "LBS-2," etc.).

The determination can also be made in other ways. For example, a client wireless device can connect to every detected ad-hoc wireless network and listen (e.g., on specific network ports) for broadcast location-based information. If such a broadcast is detected, then a determination can be made that the ad-hoc wireless network provides location-based services.

At 830, a connection is made to the ad-hoc wireless network determined to be providing location-based services. For example, a client wireless device can connect in ad-hoc mode to the ad-hoc wireless network and listen (e.g., on specific network ports) for broadcast location-based information (e.g., broadcast from an information server).

Example 20

Exemplary Method for Receiving Location-Based Information

Figure 9:
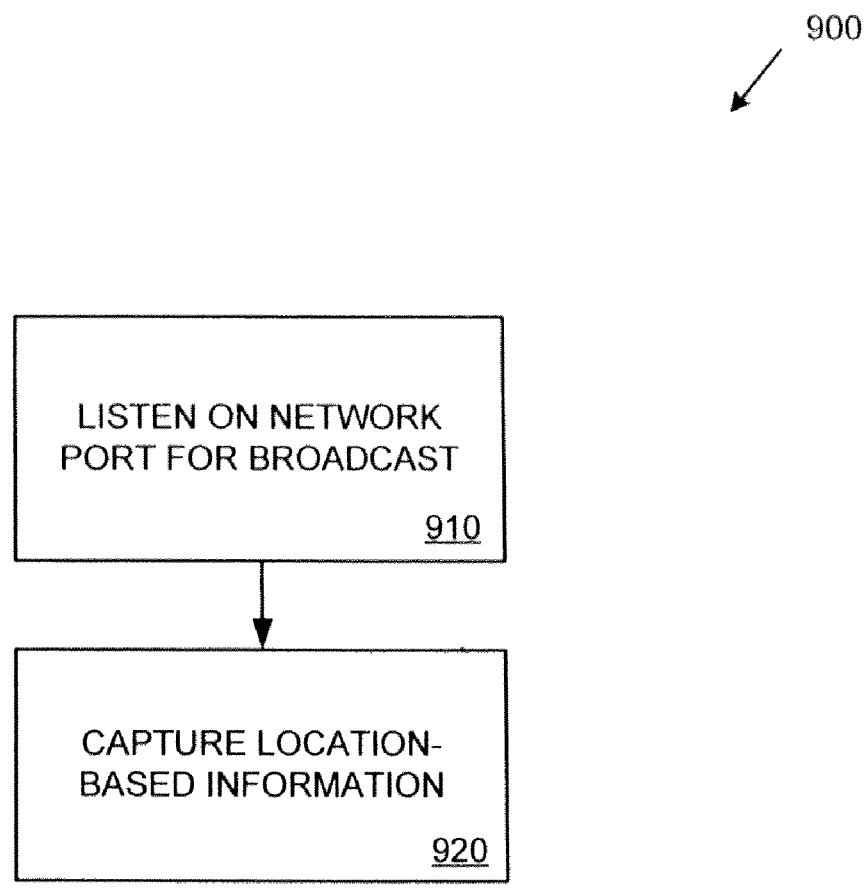
FIG. 9 is a flowchart showing an exemplary method for receiving location-based information.

FIG. 9 shows an exemplary method 900 for receiving location-based information, and can be performed, for example, by a system such as that shown in FIG. 1, 3, 4, or 6. At 910, listening is performed on network ports for broadcast location-based information. For example, a client wireless device can listen on one or more network ports (e.g., one or more UDP network port numbers) for broadcast location-based information (e.g., broadcast from an information server). Location-based information can be broadcast, for example, as an XML document.

At 920, broadcast location-based information is captured. For example, a client wireless device listening on one or more network ports can capture location-based information when it is received on the one or more network ports.

Example 21

Exemplary User Interface Depicting Preferences

Figure 10:
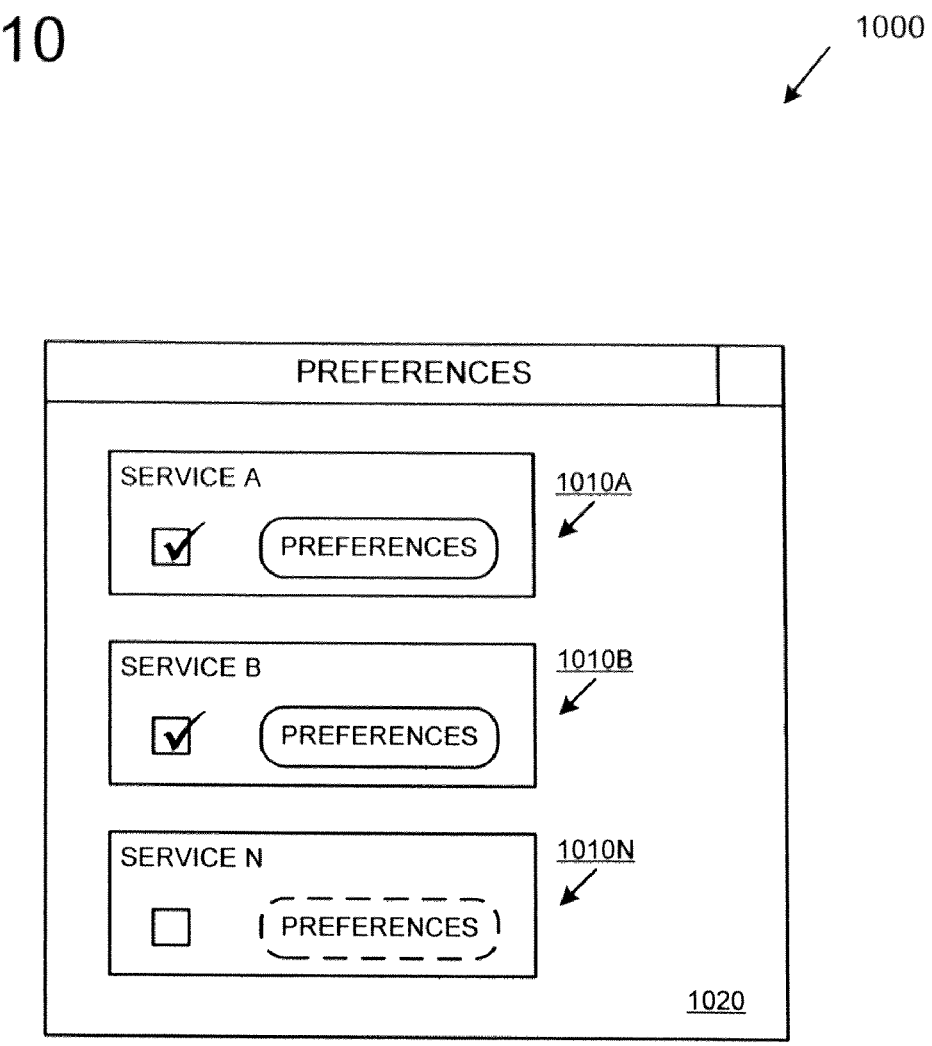
FIG. 10 is a diagram showing an exemplary user interface for setting preferences.

FIG. 10 shows an exemplary user interface 1000 depicting preferences, and can be used for setting preferences. The user interface 1000 can be displayed, for example, by client wireless devices, such as depicted in FIGS. 1, 3, and 4. In the user interface 1020, a number of preferences are displayed 1010A-N. The user interface 1020 can be the user interface of a client wireless device, and the preferences 1010A-N can control how the client wireless devices receives and processes (e.g., filters and displays) location-based information related to location-based services.

At 1010A, a preference for a specific location-based service ("Service A") is displayed. For example, "Service A" can be a library location-based service. Associated with preference 1010A is a checkbox that has been checked (e.g., by a user of the user interface). The checked checkbox can indicate that the location-based service is enabled (e.g., that location-based information will be received, and alerts displayed, for the specific location-based service "Service A"). In addition, a "Preferences" user interface control (e.g., a button or link) is associated with preference 1010A. The "Preferences" user interface control can allow a user to configure additional preferences regarding the specific location-based service "Service A."

At 1010B, a preference for a specific location-based service ("Service B") is displayed. For example, "Service B" can be an auditorium location-based service.

At 1010N, a preference for a specific location-based service ("Service N") is displayed. For example, "Service N" can be an advertising location-based service. Associated with preference 1010N is a checkbox that has not been checked (e.g., not been checked by a user of the user interface). The unchecked checkbox can indicate that the location-based service is disabled (e.g., that location-based information will not be received, and thus no alerts displayed, for the specific location-based service "Service N"). In addition, a "Preferences" user interface control (e.g., a button or link) is associated with preference 1010N. The "Preferences" user interface control is depicted as disabled (e.g., a user cannot configure additional preferences regarding the specific location-based service because the specific location-based service has been disabled).

Example 22

Figure 11:
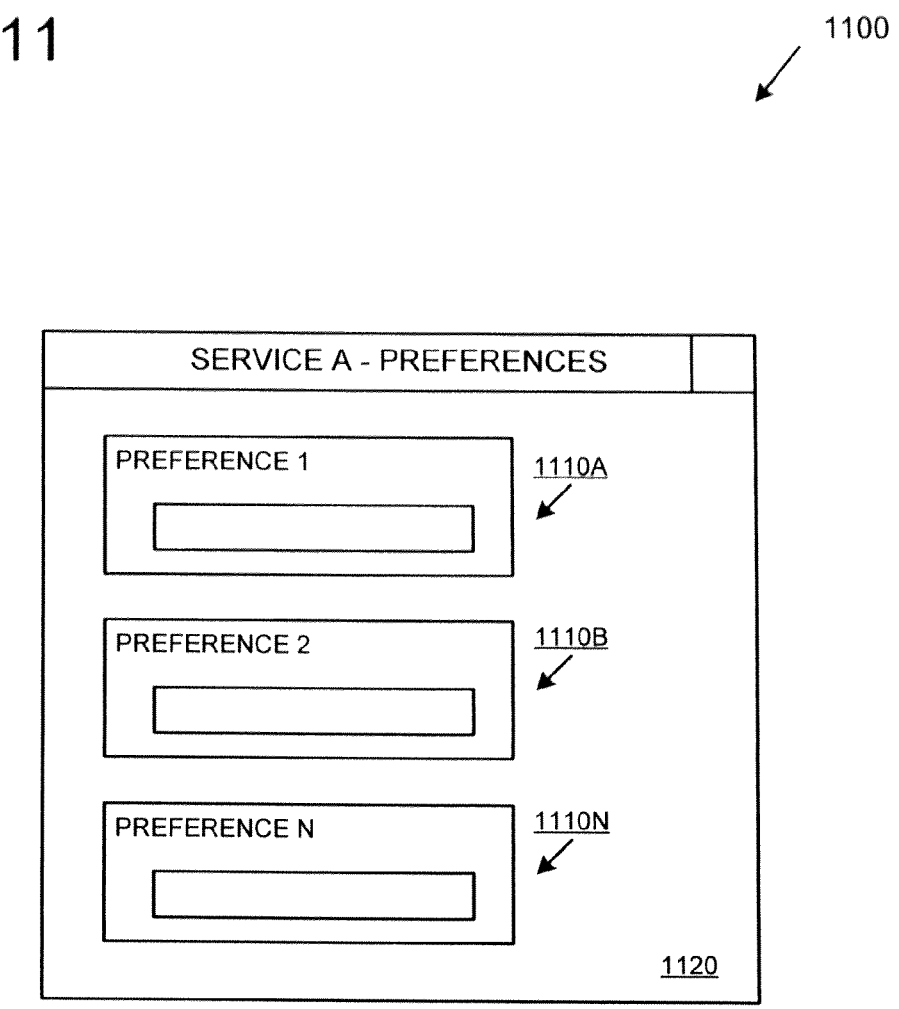
FIG. 11 is a diagram showing an exemplary user interface for setting preferences for a specific location-based service.

Exemplary User Interface Depicting Preferences for a Specific Location-Based Service FIG. 11 shows an exemplary user interface 100 depicting preferences for a specific location-based service, and can be used to set preferences for the specific location-based service. The user interface 1100 can be displayed, for example, by client wireless devices, such as depicted in FIGS. 1, 3, and 4. In the user interface 120, a number of preferences are displayed 1110A-N for a specific location-based service (in this example the specific location-based service is "Service A"). The user interface 1120 can be the user interface of a client wireless device, and the preferences 1110A-N can control how the client wireless devices receives and processes (e.g., filters and displays) location-based information related to the specific location-based service.

For example, if the specific location-based service is a general announcements location-based service (e.g., for general announcements of a business or organization), then the preferences 1110A-N can allow a user to control the display of alerts related to the general announcements location-based service. For example, 1110A can be a preference allowing the user to choose (e.g., via a drop-down user interface control) a group to which the user belongs, such as accounting, engineering, administration, IT, etc. If the user selects the "engineering" group, then location-based information received by a client wireless device of the user that contains information for the engineering group can result in display of an alert on the user's client wireless device (e.g., when the user enters a wireless network zone of the business or organization). 1110B can be another preference related to the general announcements location-based service. For example, 1110B can be a preference (e.g., a checkbox user interface control) for selecting whether the user wants to receive important event announcements (e.g., company meeting announcements).

Any number (e.g., an arbitrary number) of preferences can be displayed in the user interface 1120 for a specific location-based service.

Example 23

Exemplary User Interface Depicting an Alert

Figure 12:
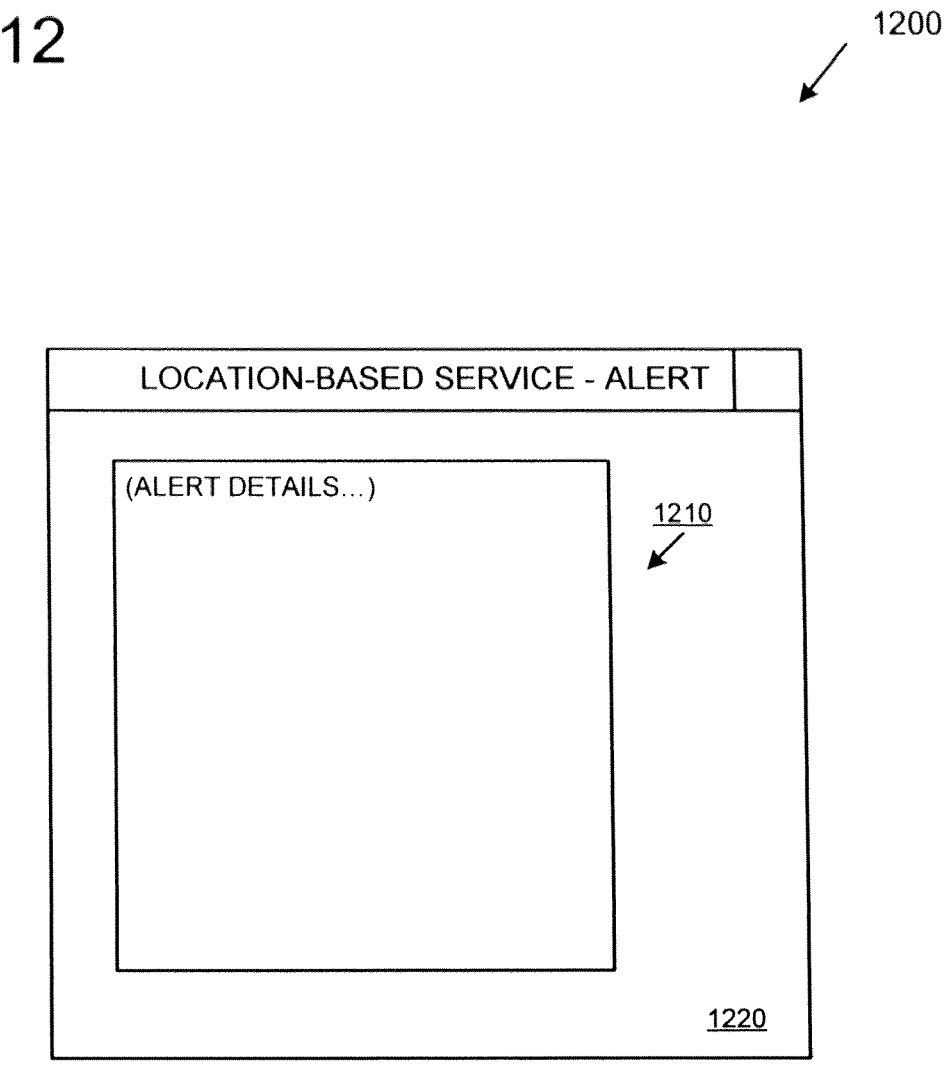
FIG. 12 is a diagram showing an exemplary user interface depicting an alert.

FIG. 12 shows an exemplary user interface 1200 depicting an alert. The user interface 1200 can be displayed, for example, by client wireless devices, such as depicted in FIGS. 1, 3, and 4. The user interface 1220 can be the user interface of a client wireless device. In the user interface 1220, the details of an alert 1210 are displayed. The alert 1210 has been displayed as a result of received location-based information (e.g., broadcast from an information server) for a specific location-based service.

For example, location-based information for a location-based service can be broadcast, in ad-hoc model by an information server within an ad-hoc wireless network zone. A client wireless device, connected to the ad-hoc wireless network in ad-hoc mode, can receive the broadcast location-based information. The client wireless device can filter the received location-based information based on preferences (e.g., the preferences described in examples 21 and 22, and depicted in FIGS. 10 and 11). After the received location-based information has been filtered based on the preferences, one or more alerts can be displayed (e.g., alert 110) on a display of the client wireless device. For example, if the location-based service is a library location-based service, and the user of the client wireless device has entered a preference for books by the author "John Doe," then the alert can comprise information about recent book arrivals at the library by the author "John Doe" when the user enters the library wireless network zone (e.g., enters the library or travels close to the library).

Multiple alerts can be displayed upon receiving broadcast location-based information regarding a specific location-based service. Multiple alerts can also be displayed upon receiving multiple broadcasts of location-based information related to multiple location-based services.

Example 24

Exemplary User Interface Depicting a Library Alerts

Figure 13A:
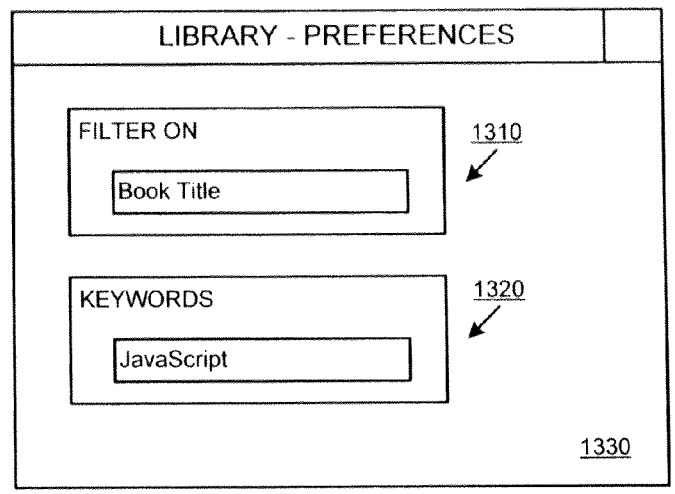
FIG. 13A is a diagram showing an exemplary user interface depicting library preferences.
Figure 13B:
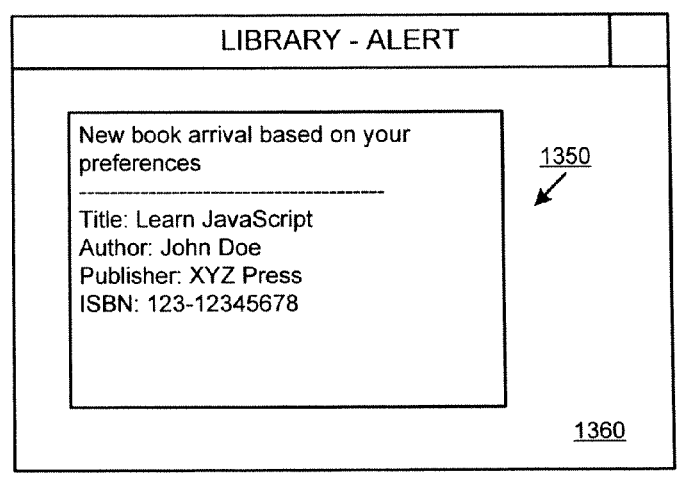
FIG. 13B is a diagram showing an exemplary user interface depicting a library alert.

FIGS. 13A and 13B show exemplary user interfaces, 1300 and 1340, depicting preferences and an alert for a library location-based service. The user interfaces, 1330 and 1360, can be displayed, for example, by client wireless devices, such as depicted in FIGS. 1, 3, and 4. The user interfaces, 1330 and 1360, can be the user interfaces of a client wireless device.

In FIG. 13A, preferences related to the library location-based service are displayed. At 1310, a preference allowing a user to select a field (e.g., book title, author, publisher, abstract, ISBN, etc.) is displayed. In the example, the user has selected "Book Title" (e.g., from a drop-down list of fields). At 1320, a preference allowing a user to enter one or more keywords is displayed. In the example, the user has entered "JavaScript," indicating that the user is interested in (e.g., wants to receive alerts regarding) book titles containing "JavaScript."

In addition to, or instead of, the specific preferences described above, other types of preferences can be displayed for the library location-based service. For example, a preference can be displayed allowing the user to indicate interest in a specific type or category of books (e.g., books about birds, cooking, decorating, etc.).

In FIG. 13B, an alert related to the library location-based service is displayed. The alert 1350 has been displayed based on the specific preferences displayed in FIG. 13A. For example, a user of a client wireless device can enter the preferences 1310 and 1320 before the user has entered the library wireless network zone. When the user, with the client wireless device, enters the library wireless network zone, the client wireless device can receive broadcast location-based information for the library location-based service. The location-based information can contain information regarding books that have recently arrived at the library (e.g., an information server providing the library location-based service can broadcast location-based information containing recently arrived books). The client wireless device can filter the received location-based information using the preferences (e.g., 1310 and 1320). If there is a match (or more than one match), the match (or matches) can be displayed on the client wireless device as one or more alerts (e.g., alert 1350). The alert 1350 contains information regarding a specific book that matches the preferences 1310 and 1320. Additional information can also be displayed in the alert 1350 (e.g., a summary of the book, a link for more information, a link to reserve or check-out the book, etc.).

Example 25

Exemplary User Interface Depicting an Auditorium Alerts

Figure 14A:
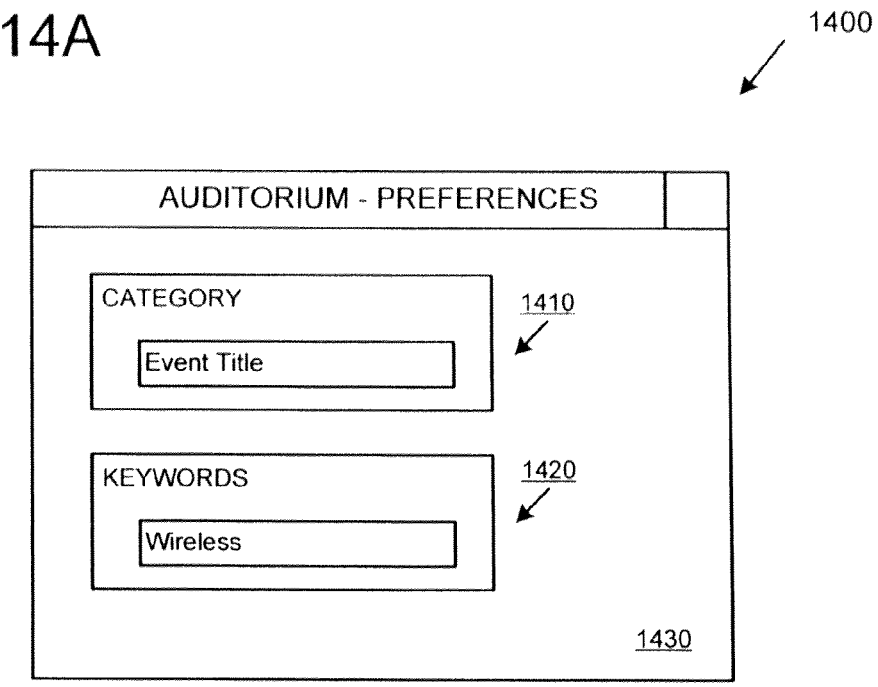
FIG. 14A is a diagram showing an exemplary user interface depicting auditorium preferences.
Figure 14B:
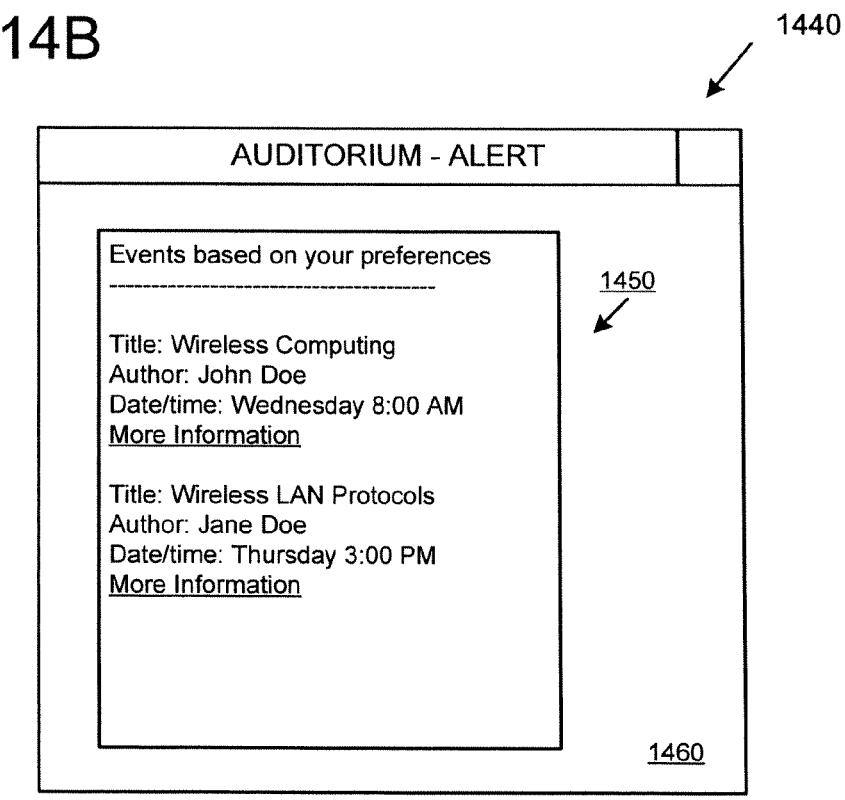
FIG. 14B is a diagram showing an exemplary user interface depicting an auditorium alert.
Figure 14C:
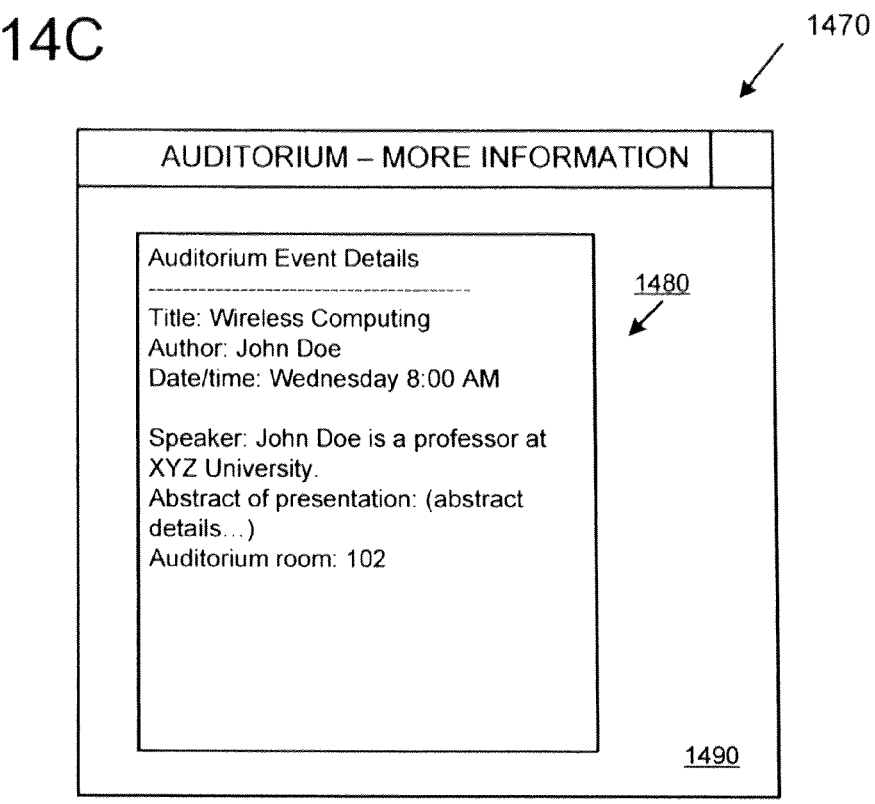
FIG. 14C is a diagram showing an exemplary user interface depicting more information.

FIGS. 14A, 14B, and 14C show exemplary user interfaces, 1400, 1440, and 1470, depicting preferences, an alert, and more information for an auditorium location-based service. The user interfaces, 1430, 1460, and 1490 can be displayed, for example, by client wireless devices, such as depicted in FIGS. 1, 3, and 4. The user interfaces, 1430, 1460, and 1490, can be the user interfaces of a client wireless device.

In FIG. 14A, preferences related to the auditorium location-based service are displayed. At 1410, a preference allowing a user to select a field (e.g., event title, speaker, topic, date, time, etc.) is displayed. In the example, the user has selected "Event Title" (e.g., from a drop-down list of fields). At 1420, a preference allowing a user to enter one or more keywords is displayed. In the example, the user has entered "Wireless," indicating that the user is interested in (e.g., wants to receive alerts regarding) event titles containing "Wireless."

In addition to, or instead of, the specific preferences described above, other types of preferences can be displayed for the auditorium location-based service. For example, a preference can be displayed allowing the user to indicate interest in a specific type or category of events (e.g., technology events, special events, etc.).

In FIG. 14B, an alert related to the auditorium location-based service is displayed. The alert 1450 has been displayed based on the specific preferences displayed in FIG. 14A. For example, a user of a client wireless device can enter the preferences 1410 and 1420 before the user has entered the auditorium wireless network zone. When the user, with the client wireless device, enters the auditorium wireless network zone, the client wireless device can receive broadcast location-based information for the auditorium location-based service. The location-based information can contain information regarding upcoming auditorium events (e.g., an information server providing the auditorium location-based service can broadcast location-based information containing upcoming events). The client wireless device can filter the received location-based information using the preferences (e.g., 1410 and 1420). If there is a match (or more than one match), the match (or matches) can be displayed on the client wireless device as one or more alerts (e.g., alert 1450). The alert 1450 contains information regarding the specific events that match the preferences 1410 and 1420. The alert 1450 also contains a link for the user to obtain more information regarding the events displayed in the alert. Additional information can also be displayed in the alert 1450 (e.g., a summary of the event, a link to sign-up to attend the event, etc.).

FIG. 14C displays additional details for the first event displayed in the alert 1450. The additional details 1480 can be displayed when a user clicks on the "more information" link in the alert 1450. The additional details, or more information, can include additional information regarding the specific event (e.g., information about the speaker, a summary or abstract of the presentation or event, the auditorium room number of the event, etc.).

For example, the "more information" link can be a web link to a web page on a web site. Clicking or selecting the web link can result in display (e.g., via a web browser) of the web page referenced by the link (e.g., the web page can be provided by the information server providing the specific location-based service).

Example 26

Exemplary User Interface Depicting a Library Search

Figure 15A:
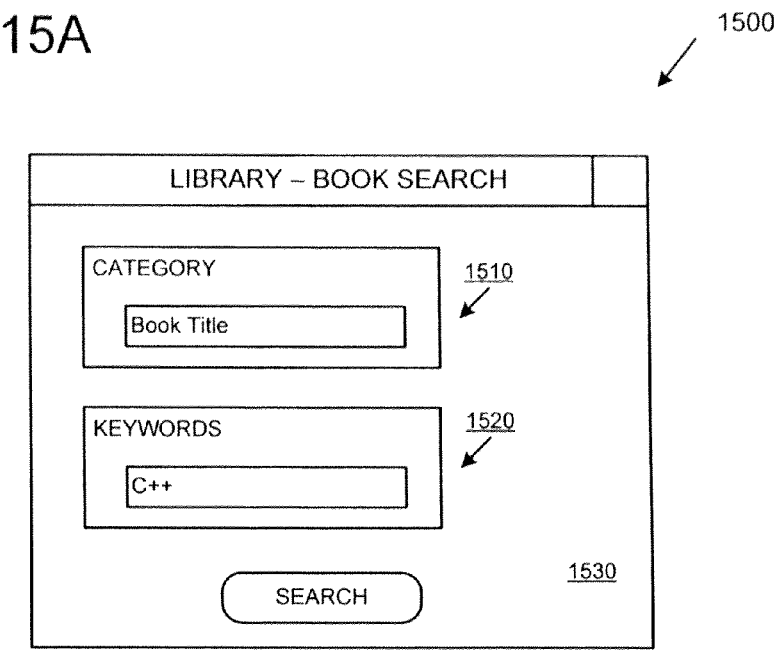
FIG. 15A is a diagram showing an exemplary user interface depicting a library search.
Figure 15B:
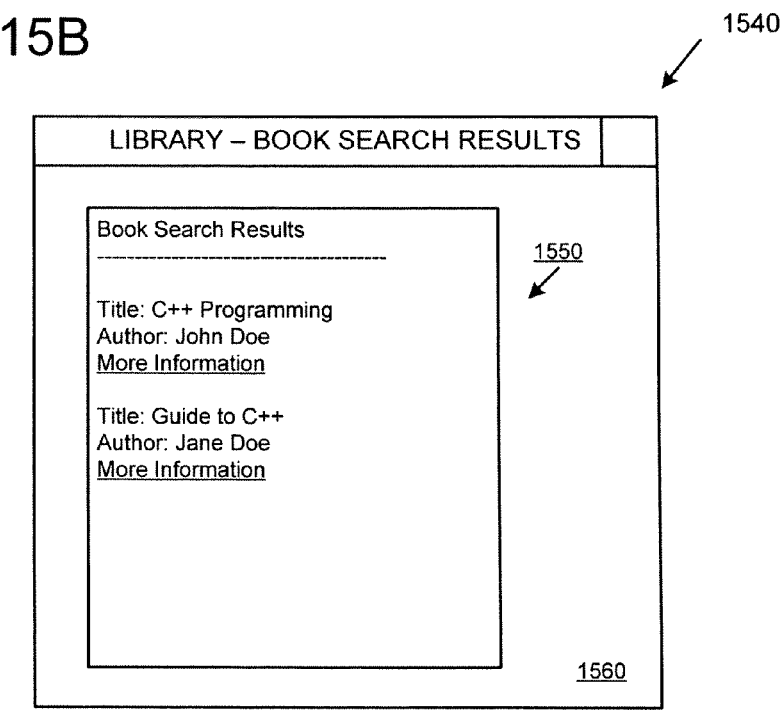
FIG. 15B is a diagram showing an exemplary user interface depicting a library search result.

FIGS. 15A and 15B show exemplary user interfaces, 1500 and 1540, depicting a library search and a library search result. The user interfaces, 1530 and 1560, can be displayed, for example, by client wireless devices, such as depicted in FIGS. 1, 3, and 4. The user interfaces, 1530 and 1560, can be the user interfaces of a client wireless device.

In FIG. 15A, a library book search user interface 1530 is displayed. For example, the library book search user interface 1530 can be a specific application allowing a user to search for library books when the user has connected, via a client wireless device, to a library location-based service. The library book search user interface 1530 can also be a web page (e.g., provided by an information server) allowing a user to search for library books when the user has connected, via a client wireless device, to a library location-based service.

The library book search user interface 1530 provides user interface elements, 1510 and 1520, for entering search criteria (e.g., book title, author, publisher, ISBN, etc.). Once the criteria have been entered, the user can search by selecting a user interface element such as a search button.

In FIG. 15B, a library book search results user interface 1560 is displayed. The results 1550 in the example are specific books that match the criteria entered in 1510 and 1520. A "more information" user interface element (e.g., a link or button) can be provided.

The user interfaces 1530 and 1560 can be different from alerts. For example, a user with a client wireless device can enter a library wireless network zone providing library location-based services and connect to the library wireless network zone (e.g., by connecting to a wireless network adapter of the library wireless network zone). The client wireless device can display one or more alerts upon entering the zone, connecting, and receiving broadcast location-based information. The client wireless device may also display no alerts. Regardless of whether alerts are displayed, the user of the client wireless device can actively interact with the library location-based service (e.g., by launching a custom application, running a web browser, or by using other types of software). For example, the user can run software on the client wireless device to search books available from the library (e.g., as depicted in 1530 and 1560).

Example 27

Exemplary Computing Environment

Figure 16:
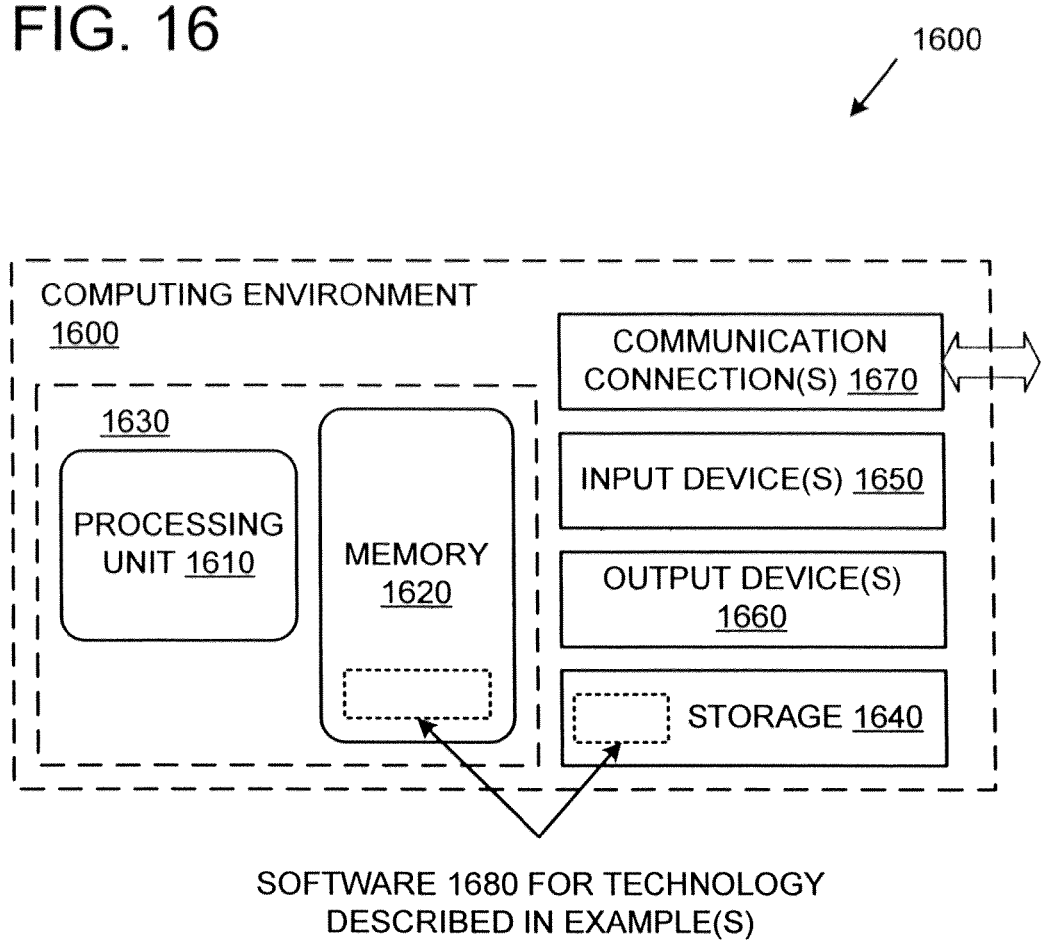
FIG. 16 is a block diagram illustrating an example of a computing environment that can be used to implement any of the technologies described herein.

FIG. 16 illustrates a generalized example of a suitable computing environment 1600 in which described embodiments, techniques, and technologies may be implemented. The computing environment 1600 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 16, the computing environment 1600 includes at least one central processing unit 1610 and memory 1620. In FIG. 16, this most basic configuration 1630 is included within a dashed line. The central processing unit 1610 executes computer-executable instructions and may be a real or a virtual processor. In a multi-processing system, multiple processing units execute computer-executable instructions to increase processing power and as such, multiple processors can, be running simultaneously. The memory 1620 may be volatile memory (e.g. registers, cache, RAM), non-volatile memory (e.g., ROM, EEPROM, flash memory, etc.), or some combination of the two. The memory 1620 stores software 1680 that can, for example, implement the technologies described herein. A computing environment may have additional features. For example, the computing environment 1600 includes storage 1640, one or more input devices 1650, one or more output devices 1660, and one or more communication connections 1670. An interconnection mechanism (not shown) such as a bus, a controller, or a network, interconnects the components of the computing environment 1600. Typically, operating system software (not shown) provides an operating environment for other software executing in the computing environment 1600, and coordinates activities of the components of the computing environment 1600.

The storage 1640 may be removable or non-removable, and includes magnetic disks, magnetic tapes or cassettes, CD-ROMs, CD-RWs, DVDs, or any other medium which can be used to store information and which can be accessed within the computing environment 1600. The storage 1640 stores instructions for the software 1680, which can implement technologies described herein.

The input device(s) 1650 may be a touch input device, such as a keyboard, keypad, mouse, pen, or trackball, a voice input device, a scanning device, or another device, that provides input to the computing environment 1600. For audio, the input device(s) 1650 may be a sound card or similar device that accepts audio input in analog or digital form, or a CD-ROM reader that provides audio samples to the computing environment 1600. The output device(s) 1660 may be a display, printer, speaker, CD-writer, or another device that provides output from the computing environment 1600.

The communication connection(s) 1670 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 1600. By way of example, and not limitation, with the computing environment 1600, computer-readable media include memory 1620, storage 1640, communication media (not shown), and combinations of any of the above.

Example 28

Exemplary Automated Methods

Any of the methods described herein can be performed via one or more computer-readable media (e.g., storage media) having computer-executable instructions for performing such methods. Operation can be fully automatic, semi-automatic, or involve manual intervention.

Example 29

Exemplary Combinations

The technologies of any example described herein can be combined with the technologies of any one or more other examples described herein.

Example 30

Exemplary Alternatives

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system for providing location-based services to a client wireless device within an ad-hoc wireless network zone, the system comprising:
   an information server configured to provide a plurality of location-based services by broadcasting, within the ad-hoc wireless network zone, location-based information regarding the plurality of location-based services, wherein the information server broadcasts the location-based information using a plurality of different pre-determined network ports, wherein the plurality of location-based services are assigned respective different pre-determined network ports of the plurality of different pre-determined network ports, and wherein the plurality of location-based services are a plurality of different location-based services; and
   a wireless network adapter used by the information server to broadcast the location-based information within the ad-hoc wireless network zone, wherein a communication range of the wireless network adapter establishes the ad-hoc wireless network zone;

wherein the client wireless device automatically connects, in ad-hoc mode, to the wireless network adapter used by the information server when the client wireless device enters the ad-hoc wireless network zone and determines that the ad-hoc wireless network zone provides the plurality of location-based services, wherein the client wireless device determines that the ad-hoc wireless network zone provides the plurality of location-based services based on an SSID of the wireless network adapter used by the information server, wherein the SSID of the wireless network adapter of the used by the information server is a pre-determined SSID, wherein the client wireless device is configured, via one or more preferences, to listen on one or more network ports of the plurality of different pre-determined network ports, wherein the client wireless device is configured, via the one or more preferences, to not listen on one or more other network ports of the plurality of different pre-determined network ports, and wherein, after connecting, the client wireless device:

receives broadcast location-based information regarding one or more location-based services which are assigned to the one or more network ports for which the client wireless device is listening; and does not receive broadcast location-based information regarding one or more location-based services which are assigned to the one or more other network ports for which the client wireless device is not listening.

2. The system of claim 1 wherein the information server broadcasts the location-based information via a first wireless network adapter configured in ad-hoc mode, and wherein the client wireless device receives the broadcast via a second wireless network adapter configured in ad-hoc mode.

3. The system of claim 2 wherein the first and the second wireless network adapters are standard 802.11x wireless network adapters.

4. The system of claim 2 wherein the first wireless network adapter is located at the information server, and wherein the second wireless network adapters is located at the client wireless device.

5. The system of claim 2 wherein the first wireless network adapter is located remotely from the information server.

6. The system of claim 1 wherein the client wireless device is configured to filter the received location-based information based on the one or more preferences, wherein the one or more preferences are user-defined preferences that are entered by a user of the client wireless device.

7. The system of claim 1 wherein the client wireless device is configured to display, to a user of the client wireless device, one or more alerts based on the received location-based information.

8. The system of claim 1 wherein at least one of the plurality of location-based services are zone-specific location-based services.

9. The system of claim 1 wherein the broadcast location-based information is received by one or more additional client wireless devices when the one or more additional client wireless devices enter the ad-hoc wireless network zone.

10. A computer implemented method for providing location-based services within an ad-hoc wireless network zone via an ad-hoc wireless network, the method comprising:

providing a plurality of location-based services by broadcasting, within the ad-hoc wireless network zone, location-based information regarding the plurality of location-based services, wherein the location-based information is broadcast in an XML format, wherein the XML format supports location-based information targeted to a specific user and a specific group of users, wherein the XML format supports targeting the specific user via a specific User ID, wherein the XML format supports targeting the specific group of users via a specific Group ID, wherein the location-based information is broadcast using a plurality of different pre-determined network ports, wherein the plurality of location-based services are assigned respective different pre-determined network ports of the plurality of different pre-determined network ports, and wherein the plurality of location-based services are a plurality of different location-based services;

wherein the broadcast location-based information is received by a client wireless device within the ad-hoc wireless network zone, wherein the client wireless device displays one or more alerts based on the received location-based information, wherein the client wireless device filters the received location-based information according to one or more user-defined preferences stored at the client wireless device, wherein the client wireless device is configured, via the one or more user-defined preferences, to listen on one or more network ports of the plurality of different pre-determined network ports, wherein the client wireless device is configured, via the one or more user-defined preferences, to not listen on one or more other network ports of the plurality of different pre-determined network ports, and wherein the client wireless device:

automatically detects, upon entering the ad-hoc wireless network zone, that the ad-hoc wireless network provides location-based services;

automatically connects to the ad-hoc wireless network upon making the determination; and after connecting to the ad-hoc wireless network, automatically receives the broadcast location-based information regarding one or more location-based services which are assigned to the one or more network ports for which the client wireless device is listening.

11. The method of claim 10 wherein the location-based information is broadcast via a first wireless network adapter configured in ad-hoc mode, and wherein the client wireless device receives the broadcast location-based information via a second wireless network adapter configured in ad-hoc mode.

12. The method of claim 10 wherein the one or more alerts are displayed based on the filtered received location-based information.

13. The method of claim 10 further comprising:

receiving, at an information server from the client wireless device, a request for additional information, wherein the request for additional information is based on the received location-based information; and transmitting, by the information server to the client wireless device, the requested additional information.

14. The method of claim 10 wherein at least one of the one or more location-based services are zone-specific location-based services.

15. One or more computer-readable media comprising computer-executable instructions for performing a computer implemented method for enabling a client wireless device to receive location-based services within an ad-hoc wireless network zone of an ad-hoc wireless network, the method comprising:

connecting, by the client wireless device, to the ad-hoc wireless network by connecting to a wireless network adapter of the ad-hoc wireless network, wherein the wireless network adapter is used to broadcast the location-based information, wherein the location-based information is broadcast using a plurality of different pre-determined network ports, wherein a plurality of location-based services are assigned respective different pre-determined network ports of the plurality of different pre-determined network ports, and wherein the plurality of location-based services are a plurality of different location-based services, wherein the connecting to the ad-hoc wireless network comprises:

scanning for ad-hoc wireless networks providing location-based services, wherein the scanning is performed automatically by the client wireless device without user intervention;

determining that the ad-hoc wireless network provides the plurality of location-based services, wherein the determining is performed automatically by the client wireless device without user intervention, and wherein the determining that the ad-hoc wireless network provides the plurality of location-based services is based on an SSID of the wireless network adapter; and connecting to the ad-hoc wireless network in ad-hoc mode, wherein the connecting is performed automatically by the client wireless device without user intervention;

after connecting, receiving, by the client wireless device, the location-based information regarding the plurality of location-based services provided within the ad-hoc wireless network zone, wherein the location-based information is broadcast within the ad-hoc wireless network zone, wherein the client wireless device is configured, via one or more user-defined preferences entered by a user of the client wireless device, to listen on one or more network ports of the plurality of different pre-determined network ports, wherein the client wireless device is configured, via the one or more user-defined preferences, to not listen on one or more other network ports of the plurality of different pre-determined network ports, and wherein the receiving the location-based information comprises:

listening on the on one or more network ports of the plurality of different pre-determined network ports for the broadcast; and capturing broadcast location-based information received on the on one or more network ports of the plurality of different pre-determined network ports for which the client wireless device is listening; and filtering the received location-based information based on the one or more user-defined preferences; and displaying, at the client wireless device, one or more alerts based on the received location-based information.

16. The one or more computer-readable media of claim 15, wherein the one or more alerts are displayed based on the filtered received location-based information.

* * * * *

UNITED STATES PATENT AND TRADEMARK OFFICE
CERTIFICATE OF CORRECTION

PATENT NO. : 7,787,887 B2  Page 1 of 1
APPLICATION NO. : 11/532873
DATED : August 31, 2010
INVENTOR(S) : Gupta et al.

It is certified that error appears in the above-identified patent and that said Letters Patent is hereby corrected as shown below:

On the Title Page
Item (73), "Infosys Technolologies Ltd." should read --Infosys Technologies Ltd.--

Col. 7, line 46, "adapter. Client" should read --adapter. ¶ Client--
Col. 9, line 56, "location based" should read --location-based--
Col. 12, lines 28 and 49, "ad-on" should read --add-on--
Col. 15, line 44, "location based" should read --location-based--
Col. 16, line 33, "The client wireless" should read --The client wireless device--
Col. 17, lines 4-5, "in formation" should read --information--
Col. 19, line 38, "100" should read --1100--
Col. 19, line 43, "120" should read --1120--

In the Claims:
Col. 25, line 14, "of the used by the information server" should read --used by the information server--

Signed and Sealed this
Twenty-third Day of August, 2011

David J. Kappos
*Director of the United States Patent and Trademark Office*